United States Patent
Bick et al.

(10) Patent No.: US 6,185,320 B1
(45) Date of Patent: Feb. 6, 2001

(54) METHOD AND SYSTEM FOR DETECTION OF LESIONS IN MEDICAL IMAGES

(75) Inventors: Ulrich Bick, Muenster (DE); Maryellen L. Giger, Elmhurst, IL (US)

(73) Assignee: Arch Development Corporation, Chicago, IL (US)

( * ) Notice: Under 35 U.S.C. 154(b), the term of this patent shall be extended for 0 days.

(21) Appl. No.: 08/982,282

(22) Filed: Dec. 1, 1997

Related U.S. Application Data

(63) Continuation of application No. 08/398,307, filed on Mar. 3, 1995, now abandoned.

(51) Int. Cl.[7] .................................................. G06K 9/00

(52) U.S. Cl. .......................... 382/132; 382/173; 382/209; 382/260; 382/308

(58) Field of Search ............................ 382/128, 130–133, 382/298, 261, 174, 190, 197, 209, 256, 260, 280, 169, 171, 172, 173, 308; 378/37, 4, 21; 600/300

(56) References Cited

U.S. PATENT DOCUMENTS

| | | | |
|---|---|---|---|
| 4,761,819 | * 8/1988 | Denison et al. | 382/261 |
| 4,797,806 | * 1/1989 | Krich | 382/203 |
| 4,945,478 | * 7/1990 | Merickel et al. | 382/131 |
| 5,016,173 | * 5/1991 | Kenet et al. | 382/128 |
| 5,079,698 | * 1/1992 | Grenier et al. | 382/128 |
| 5,121,436 | 6/1992 | Kasdan et al. | 382/128 |
| 5,212,637 | * 5/1993 | Saxena | 128/653.1 |
| 5,237,626 | * 8/1993 | Forslund et al. | 382/256 |

(List continued on next page.)

FOREIGN PATENT DOCUMENTS

WO 91/07135   5/1991   (WO) .

OTHER PUBLICATIONS

Maragos, Petros, "Tutorial on Advances in Morphological Image Processing and Analysis", 1987 Society of Photo–Optical Instrumentation Engineers, vol. 26, No. 7, pp. 623–632.*

P. Nickolls, Pattern Recognition Society, vol. 14, Nos. 1–6, 1981, "Pre–Processing of Images in an Automated Chromosome Analysis System", pp. 219–229.*

Kobatake, Hidefumi, Faculty of Technology, Tokyo University, "Computer Diagnosis of Breast Cancer by Mammogram Processing", 1992, pp. 626–629.*

Press et al., Cambridge University Press, "Numerical Recipes, The Art of Computing", 1992, pp. 326–333.*

Sammon, John W., IEEE Transactions on Computers, vol. C–19, No. 7, Jul. 1970, "Interactive Pattern Analysis and Classification", pp. 594–615..*

Eric Persoon, IEEE Transactions on Systems, Man, and Cybernetics, vol. SMC–7, No. 3, pp. 170 to 179, "Shape Discrimination Using Fourier Descriptors", Mar. 3, 1997.

* cited by examiner

Primary Examiner—Jay Patel
(74) Attorney, Agent, or Firm—Oblon, Spivak, McClelland, Maier & Neustadt, P.C.

(57) ABSTRACT

A method and system for the automated detection of lesions in medical images. Medical images, such as mammograms are segmented and optionally processing with peripheral enhancement and/or modified median filtering. A modified morphological open operation and filtering with a modified mass filter are performed for the initial detection of circumscribed lesions. Then, the lesions are matched using a deformable shape template with Fourier descriptors. Characterization of the match is done using simulated annealing, and measuring the circularity and density characteristics of the suspected lesion. The procedure is performed iteratively at different spatial resolution in which at each resolution step a specific lesion size is detected. The detection of the lesion leads to a localization of a suspicious region and thus the likelihood of cancer.

55 Claims, 26 Drawing Sheets

U.S. PATENT DOCUMENTS

| | | | |
|---|---|---|---|
| 5,359,513 | * 10/1994 | Kano et al. | 382/128 |
| 5,432,865 | * 7/1995 | Kasdan et al. | 382/128 |
| 5,440,653 | * 8/1995 | Greggain et al. | 382/298 |
| 5,452,367 | * 9/1995 | Bick et al. | 382/128 |
| 5,544,219 | * 8/1996 | Muller et al. | 378/210 |
| 5,579,445 | * 11/1996 | Loce et al. | 395/102 |
| 5,757,953 | * 5/1998 | Jang | 382/132 |
| 5,781,667 | * 7/1998 | Schmidt et al. | 382/308 |
| 5,911,014 | * 6/1999 | Yamada | 382/308 |

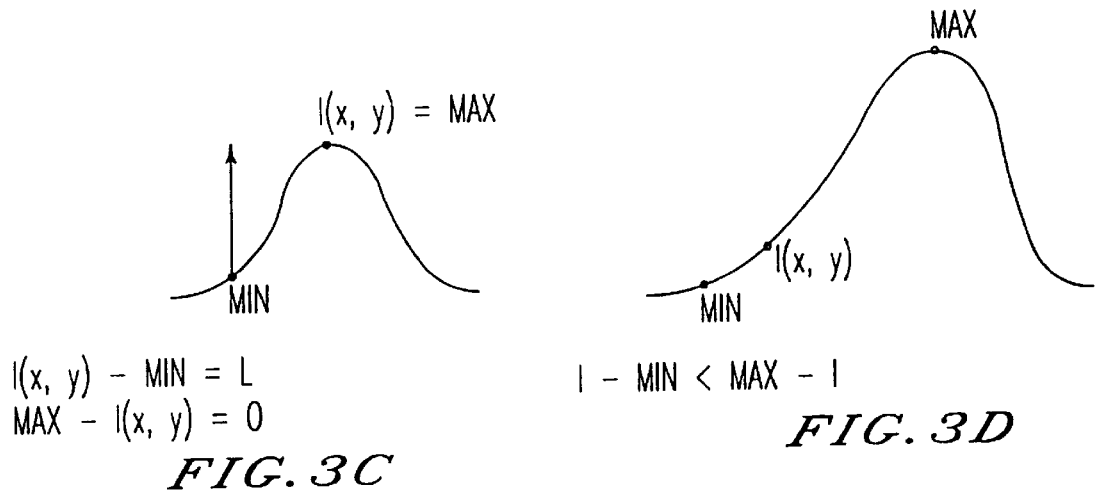
$I(x, y) - MIN = L$
$MAX - I(x, y) = 0$
FIG. 3C
$I - MIN < MAX - I$
FIG. 3D
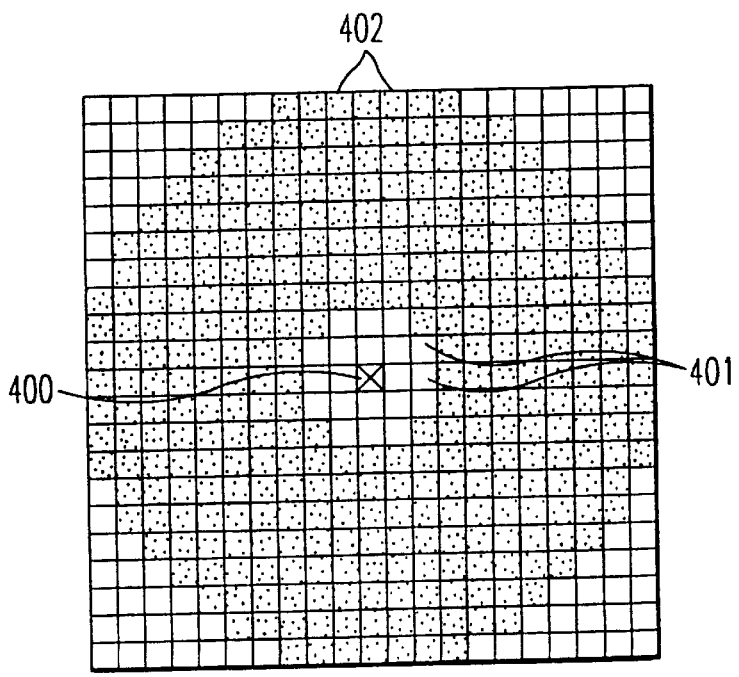
FIG. 4

| PIXEL SIZE | DETECTED LESION SIZE |
|---|---|
| 500 MICRON | 4-10 mm |
| 1000 MICRON | 8-21 mm |
| 2000 MICRON | 16-42 mm |
| 4000 MICRON | 32-84 mm |

*FIG. 9A*

| KERNEL RADIUS (INNER; IN PIXELS) | KERNEL RADIUS (OUTER; IN PIXELS) | DETECTED LESION SIZE (mm) |
|---|---|---|
| 3 | 12 | 4-10 |
| 6 | 24 | 8-21 |
| 12 | 48 | 16-42 |
| 24 | 96 | 32-84 |

*FIG. 9B*

METHOD AND SYSTEM FOR DETECTION OF LESIONS IN MEDICAL IMAGES

The present invention is a continuous application of application Ser. No. 08/398,307, filed on Mar. 3, 1995 and now abandoned.

The present invention was made in part with U.S. Government support under grant numbers CA48985 (National Institute of Health), DAMD17-93-J-3021 (Army Research Office), and FRA-390 (American Cancer Society). The Government has certain rights in the invention.

BACKGROUND OF THE INVENTION

1. Field of the Invention

The invention relates generally to a method and system for an improved computerized, automatic detection and characterization of lesions in medical images, and more particularly to the detection of circumscribed masses in digital mammograms. Novel techniques in the localization (segmentation) and detection of masses in mammograms, include initially processing with peripheral equalization (correction), a modified median filter, a modified morphological open operation, filtering with a modified mass filter for the initial detection of circumscribed densities, matching using a deformable shape template with Fourier descriptors, optimization of the match using simulated annealing, and measuring the circularity and density characteristics of the suspected lesion to distinguish true positives from false positives and malignant lesions from benign lesions. The procedure is performed iteratively at different spatial resolution in which at each resolution step a specific lesion size is detected. The detection of the mass leads to a localization of a suspicious region and thus the likelihood of cancer.

2. Discussion of the Background

Although mammography is currently the best method for the detection of breast cancer, between 10–30% of women who have breast cancer and undergo mammography have negative mammograms. In approximately two-thirds of these false-negative mammograms, the radiologist failed to detect the cancer that was evident retrospectively. The missed detections may be due to the subtle nature of the radiographic findings (i.e., low conspicuity of the lesion), poor image quality, eye fatigue or oversight by the radiologists. In addition, it has been suggested that double reading (by two radiologists) may increase sensitivity. It is apparent that the efficiency and effectiveness of screening procedures could be increased by using a computer system, as a "second opinion or second reading", to aid the radiologist by indicating locations of suspicious abnormalities in mammograms. In addition, mammography is becoming a high volume x-ray procedure routinely interpreted by radiologists.

If a suspicious region is detected by a radiologist, he or she must then visually extract various radiographic characteristics. Using these features, the radiologist then decides if the abnormality is likely to be malignant or benign, and what course of action should be recommended (i.e., return to screening, return for follow-up or return for biopsy). Many patients are referred for surgical biopsy on the basis of a radiographically detected mass lesion or cluster of microcalcifications. Although general rules for the differentiation between benign and malignant breast lesions exist, considerable misclassification of lesions occurs with current radiographic techniques. On average, only 10–20% of masses referred for surgical breast biopsy are actually malignant. Thus, another aim of computer use is to extract and analyze the characteristics of benign and malignant lesions in an objective manner in order to aid the radiologist by reducing the numbers of false-positive diagnoses of malignancies, thereby decreasing patient morbidity as well as the number of surgical biopsies performed and their associated complications.

SUMMARY OF THE INVENTION

Accordingly, an object of this invention is to provide a method and system for detecting, classifying, and displaying masses in medical images of the breast.

Another object of this invention is to provide an automated method and system for the detection and/or classification of masses based on a multi-resolution analysis of mammograms.

Another object of this invention is to provide an automated method and system for the detection and/or classification of masses based on a modified morphological open operation, filtering with a modified mass filter for the initial detection of circumscribed densities, matching using a deformable shape template with Fourier descriptors, optimization of the match using simulated annealing, and measuring the circularity and density characteristics of the suspected lesion.

These and other objects are achieved according to the invention by providing a new and improved automated method and system in which a segmentation of densities (masses) within a mammogram is performed followed by optimal characterization.

BRIEF DESCRIPTION OF THE DRAWINGS

A more complete appreciation of the invention and many of the attendant advantages thereof will be readily obtained as the same becomes better understood by the reference to the following detailed description when considered in connection with the accompanying drawings, wherein:

FIGS. 3C and 3D are graphs illustrating the criteria used in the modified morphological open operation of FIG. 3B;

FIG. 4 is a diagram illustrating the circular kernel used in the modified mass filter;

FIGS. 9A and 9B are tables illustrating the relationship between pixel size of the image and the lesion size being detected, and the relationship between kernel size and the lesion size being detected, respectively;

DETAILED DESCRIPTION OF THE PREFERRED EMBODIMENTS

Figure 1A:
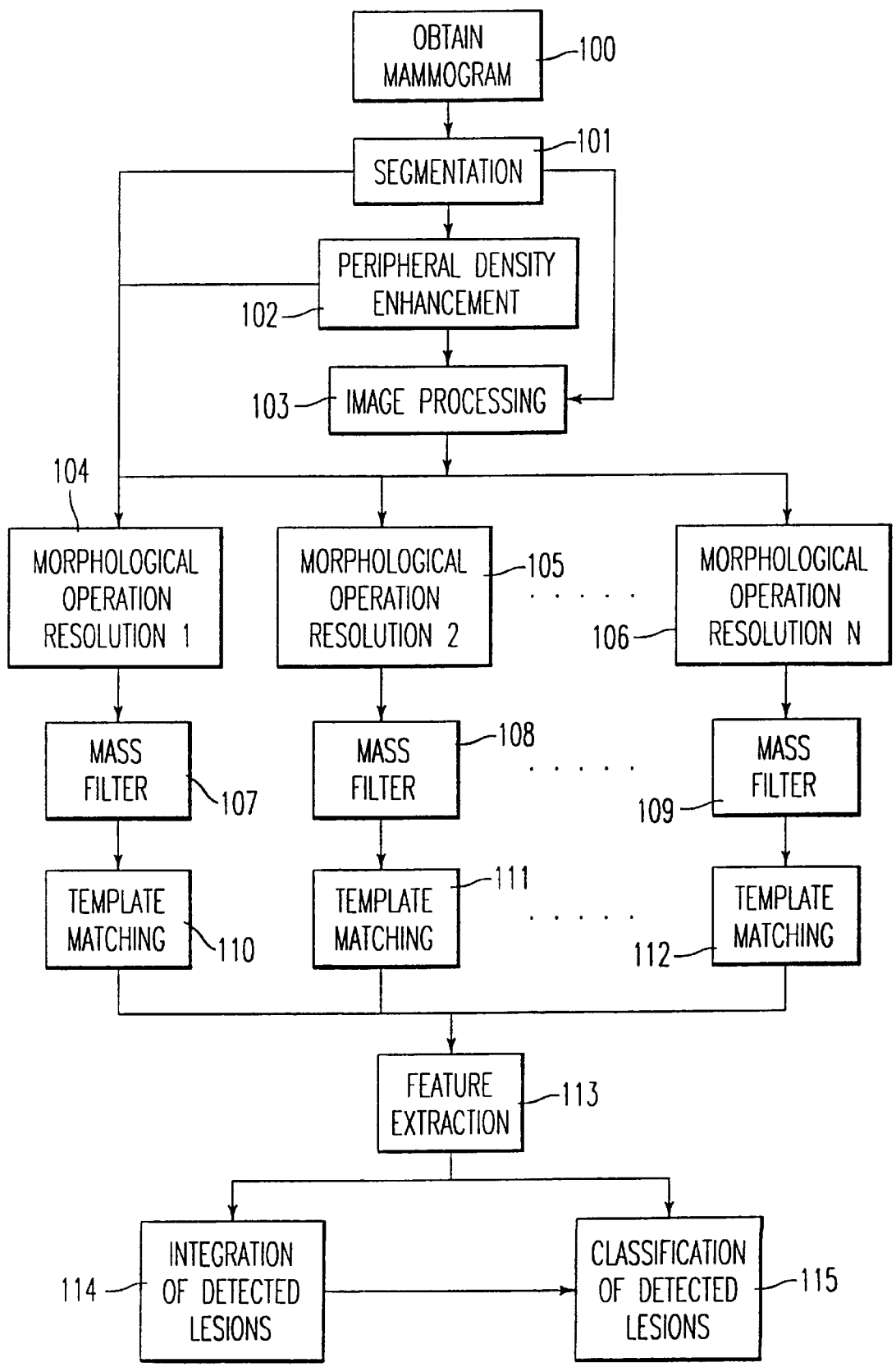
FIGS. 1A–1C are schematic diagram illustrating embodiments of the automated method for the detection of lesions according to the invention.
Figure 1B:
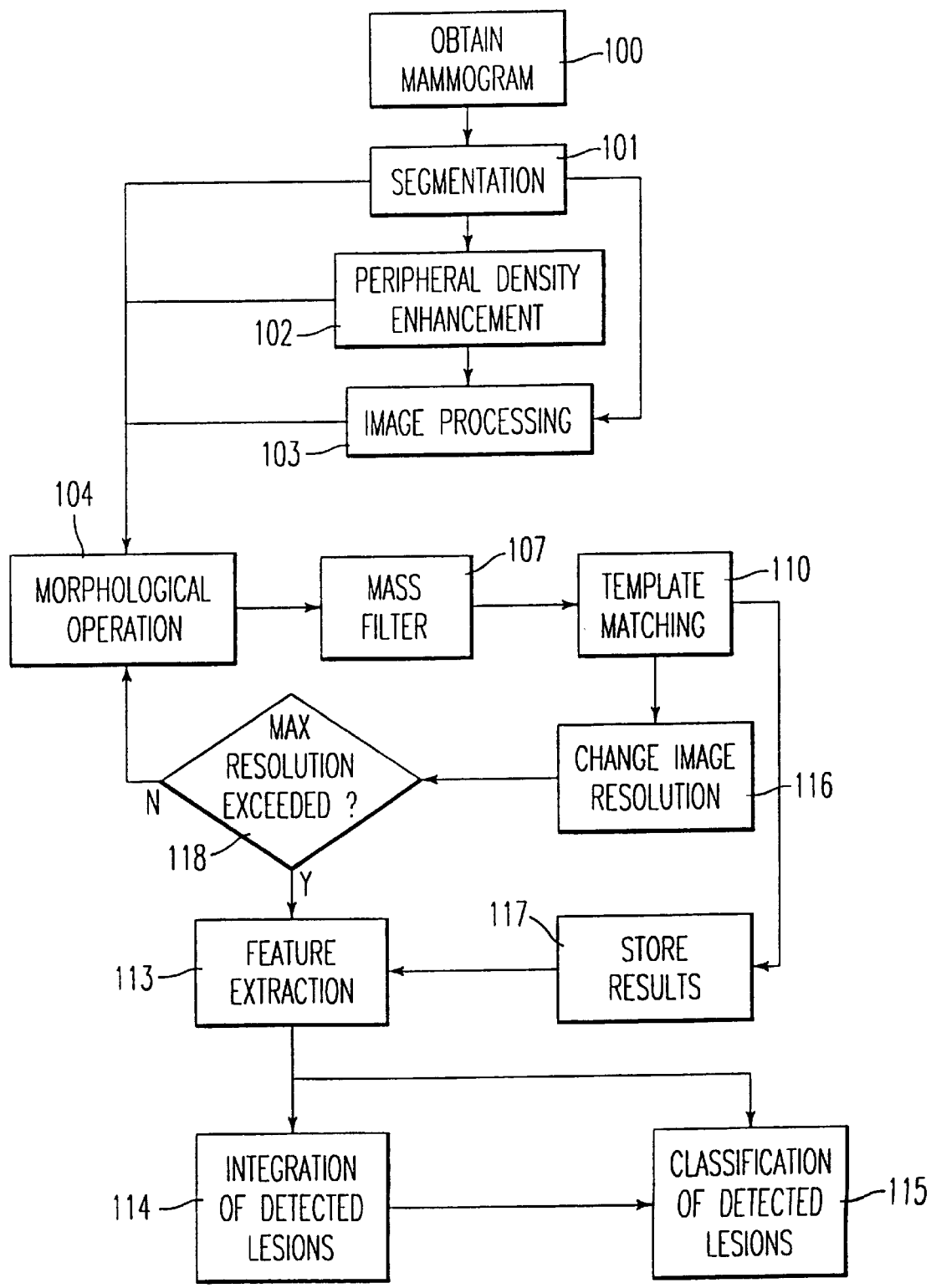
Figure 1C:
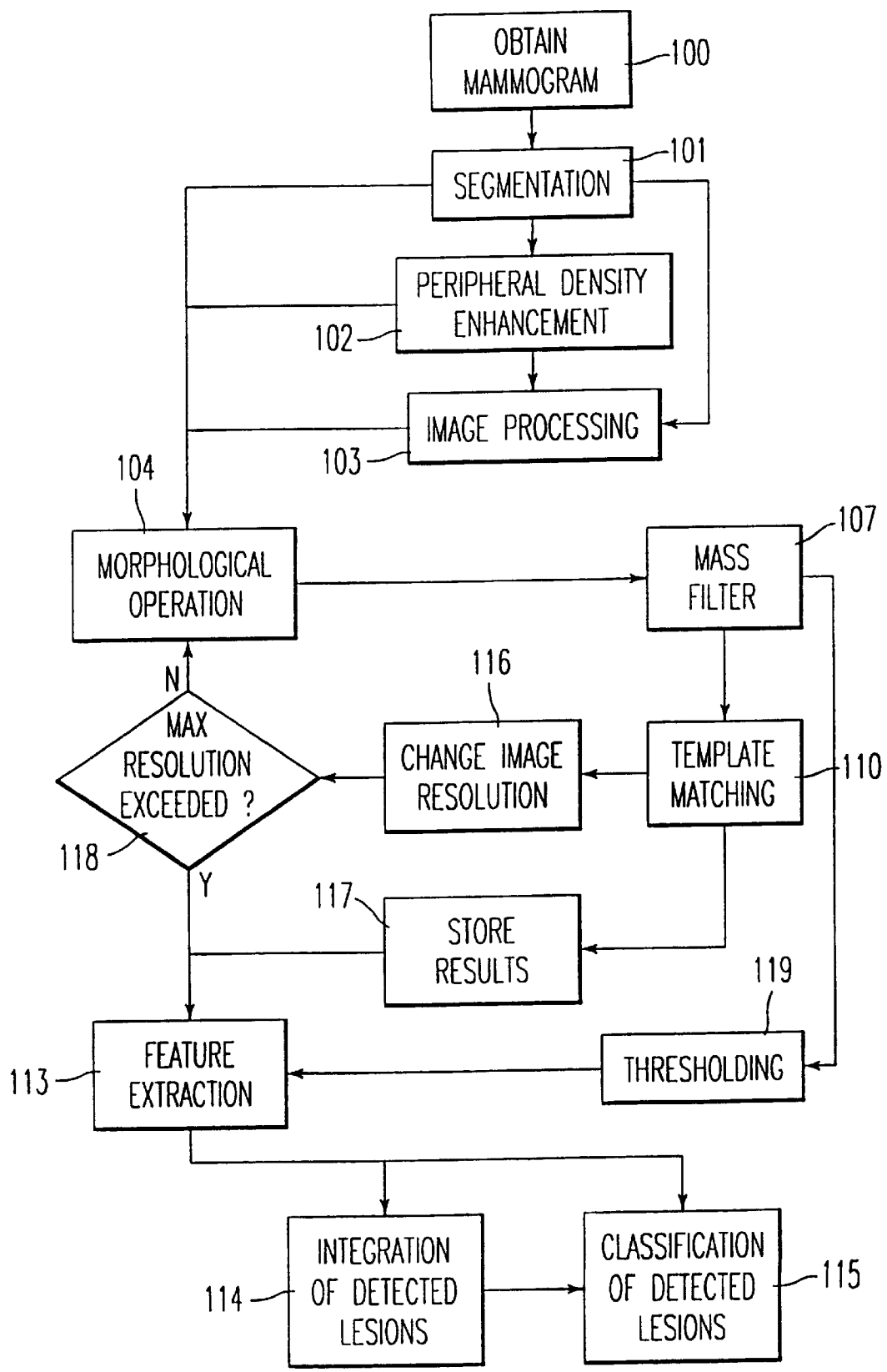

Referring now to the drawings, and more particularly to FIGS. 1A–1C thereof, schematic diagrams of the automated method for the detection and classification of lesions in breast images is shown. In FIG. 1A a first embodiment of the overall scheme includes an initial acquisition of a mammogram and digitization (step 100). Next, the breast border is segmented from the rest of the image area (step 101) and peripheral density enhancement is performed on the image (step 102). The image is processed (step 103) and then subjected to a modified morphological open operation using different filter sizes (steps 104–106). The image after the open operation is mass filtered (steps 107–109) and template matched (steps 110–112). Feature extraction is then performed (step 113) followed by integration (step 114) and classification (step 115) of the detected lesions.

The method of detecting circumscribed masses according to the invention uses an automatically segmented mammographic image indicating only the actual breast region (step 101) after an optional application of the peripheral density equalization (step 102). Segmentation of a mammogram is described in application Ser. No. 08/158,320 to Bick et al, the disclosure of which is herein incorporated by reference.

In the segmentation process, noise filtering is applied to the digital mammogram followed by application of the gray-value range operator. Using information from the local range operator a modified global histogram analysis is performed. Region growing is performed on the threshold image using connectivity (counting pixels), followed by a morphological erosion operation. The distance map of the image is determined and the boundary of the segmented object (breast) in the image is then tracked to yield its contour. The contour can then be output onto the digital image or passed to other computer algorithms.

Note that there is an inverse relationship between gray level and optical density. A low optical density (white region) on the mammogram (high anatomic density) corresponds to a high gray level (1023), whereas a high optical density (black region) on the mammogram corresponds to a low gray level (0).

Figure 2:
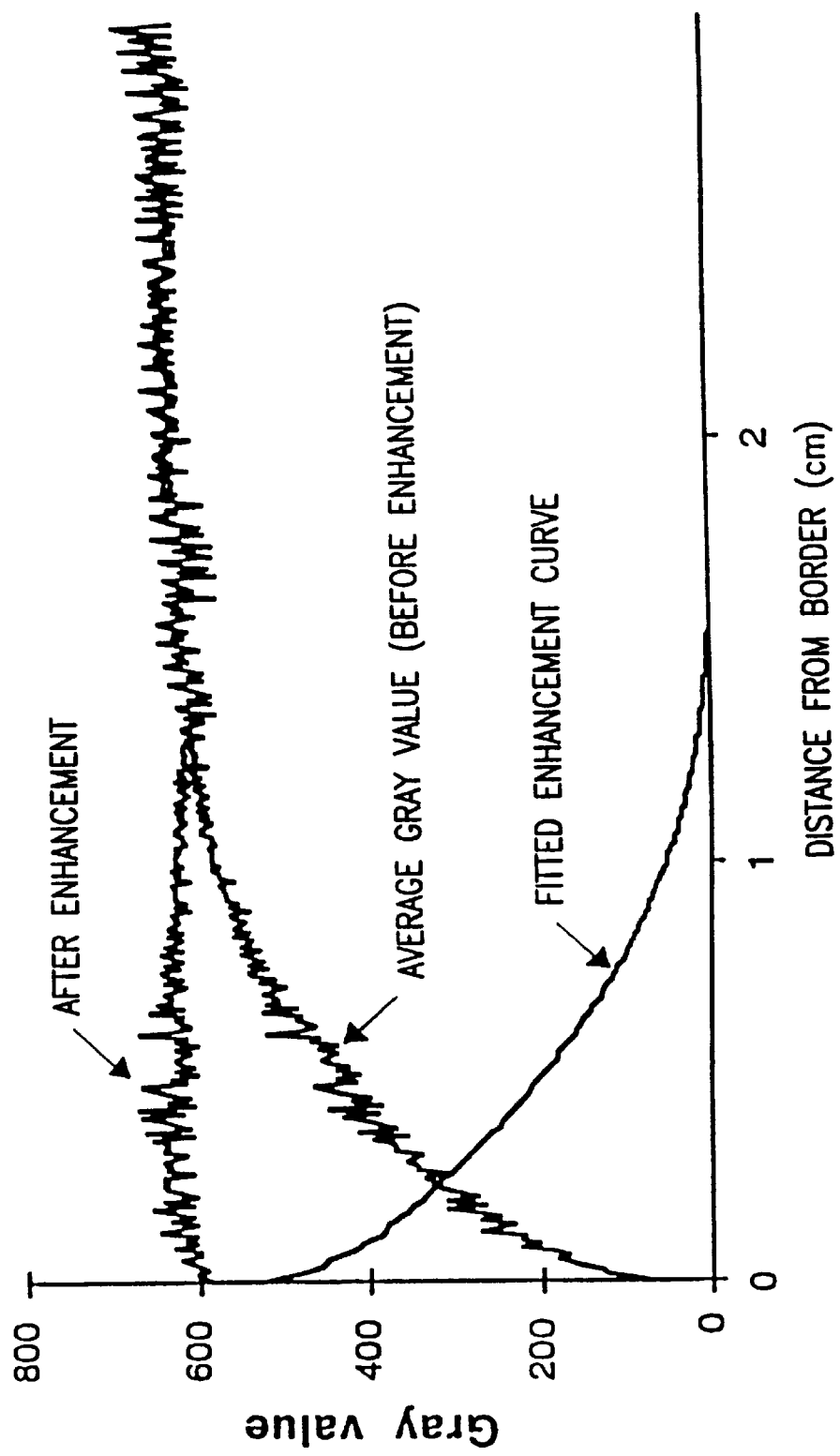
FIG. 2 is a graph illustrating the step of peripheral enhancement according to the invention.

The image after segmenting can be processed (step 103) or peripheral density enhancement can be performed. Peripheral density enhancement is described in application Ser. No. 08/158,320. The average gray values of the pixels as a function of distance from the breast border is determined. An enhancement curve is determined by fitting, such as polynomial fitting, a curve of the average gray values as a function of distance, and then reversing the fit. The enhancement curve is added to the curve of the average gray values as a function of distance to produce an enhanced gray value curve. This results in a peripherally enhanced image where the center and the portion near the border are simultaneously displayed without loss in contrast. FIG. 2 shows the curve of the average gray values as a function of distance, the reversed fitted curve and the peripherally enhanced curve.

Figure 3A:
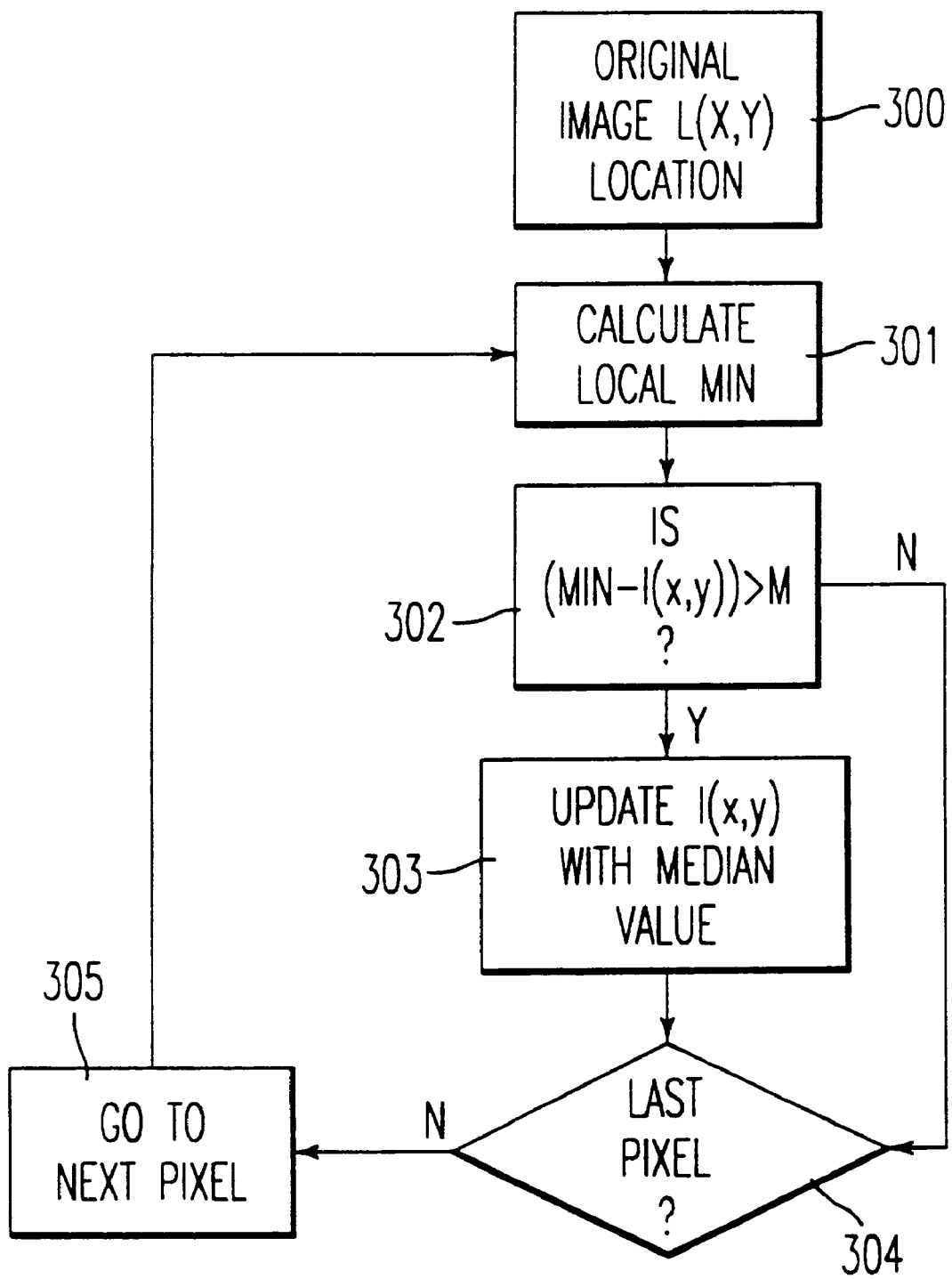
FIG. 3A is a schematic diagram of the modified median filtering according to the invention.

The segmented image, with or without peripheral density enhancement, is then optionally processed (step 103). An initial modified median filter of size nxn may be used to eliminate isolated aberrant (very dark, low gray level) pixel values in the segmented image, since this would disturb the erosion step. The modified median filtering is shown in FIG. 3A. The median filter can be of 3×3 size, for example. The conventional median filter is described in, for example, "The Image Processing Handbook," 2nd Ed., by John Russ (CRC Press 1995).

At a beginning pixel location l(x,y) in the image (step 300), which can be either the segmented or the peripherally enhanced segmented image, the local minimum is determined (step 301) in the surrounding neighborhood (nxn pixels). If the gray level at pixel location l(x,y) is smaller than the local minimum by a certain number of gray levels (M) in step 302, then that gray level is corrected by the median filter (step 303). An example of M is 5 gray levels, but other values are possible. In the embodiment, the gray level of the pixel at l(x,y) is updated to the median pixel value of the neighborhood.

It is checked whether the pixel is the last pixel for processing ( step 304). If no, the next pixel is selected (step 305) and step 301 is repeated. If the answer in step 302 is no, the process moves to step 304. When the last pixel location is reached (step 304), the filtering is completed for all of the pixels in the image.

Figure 3B:
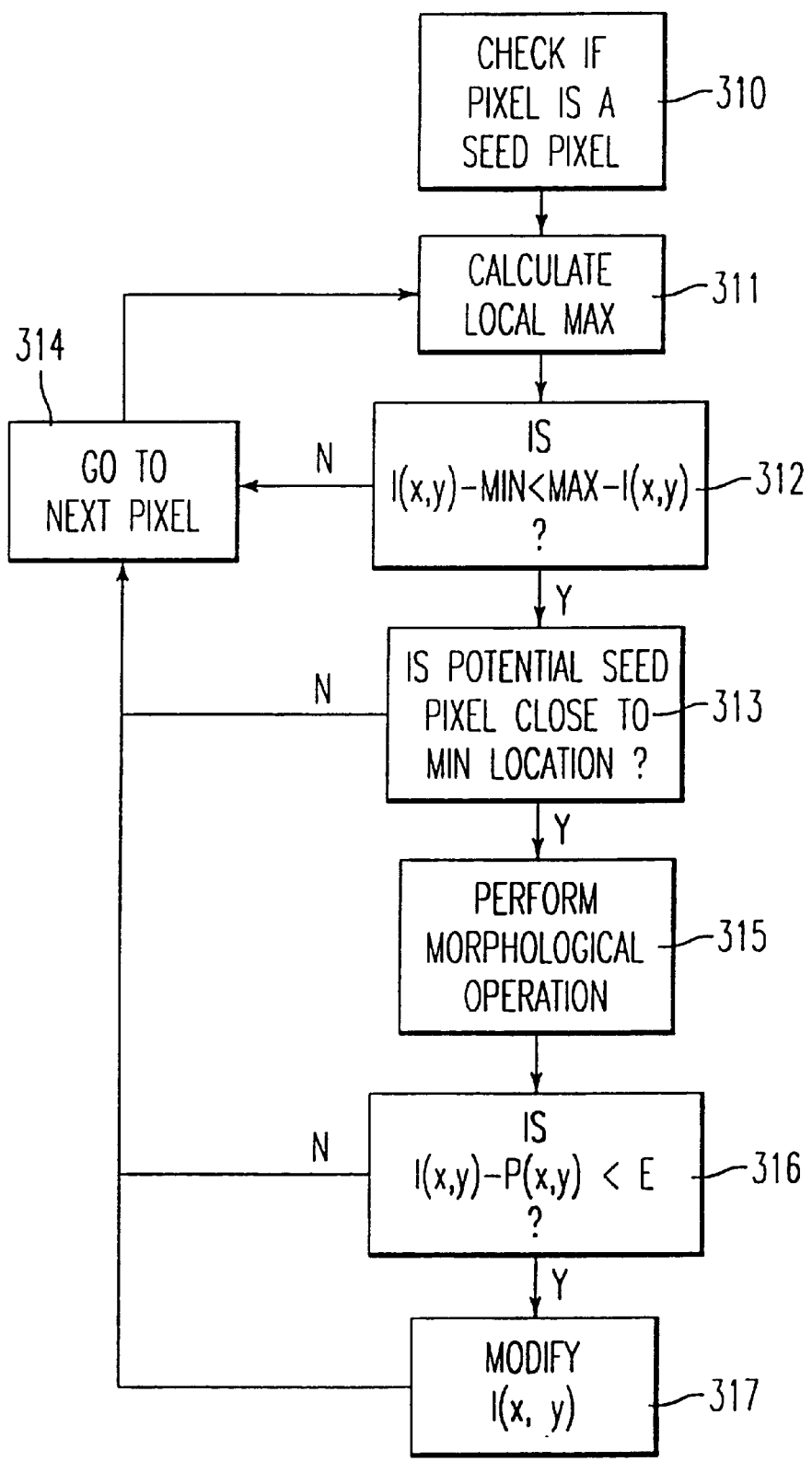
FIG. 3B is a schematic diagram of the modified morphological open operation according to the invention.

Two criteria are then used to control which pixels are used as seed pixels for the morphological operation, to preserve the gray value characteristics of larger lesions as far as possible. As shown in FIG. 3B, beginning at pixel location l(x,y) (step 310) a check is made to determine whether pixel l(x,y) is a seed pixel. The local maximum of the neighborhood is calculated (step 311).

To qualify as a seed pixel the following criteria must be fulfilled. First, there must be a negative Laplacian (gray value of the pixel in question minus the local minimum gray value must be less than the local maximum gray value minus the gray value of the pixel in question, (step 312). This, as demonstrated in FIGS. 3C and 3D, prevents erosion of the center of a small mass. In FIG. 3C the gray value I(x,y)= MAX, so no change is made to pixel value and the center is preserved. In FIG. 3D, I(x,y)−MIN<MAX−I(x,y), so the gray value of pixel at location l(x,y) is changed.

Second, only pixels with a small distance from the local minimum are used as erosion centers (step 313). That is, the location of the seed pixel must be close to the location of the local MIN. This preserves the gray value slope in the periphery of larger lesions. An example of the distance is 3 pixels, and other values may be chosen.

If the answer is no at either of steps 312 and 313, the next pixel is selected (step 314) and the process is repeated. For those pixels which qualify as a seed pixel, the morphological open operation is performed (step 315).

The morphological open (erosion followed by dilation) shown in FIG. 3B is performed on the segmented image, with or without modified median filtering, as shown in FIG. 1A. The morphological open operation is also described in Russ, supra. Only the erosion processing can be performed, omitting the dilation procedure. The main effect of the erosion is smoothing of the image while keeping lesions that are of interest. The main effect of the dilation is to return masses to roughly their original size. The dilation is optional.

The structuring element in the embodiment for the morphological operation is a circle with a diameter of 7 pixels, e.g. for a pixel size of 0.5 mm. The structuring eliminates small circular and thin linear structures up to a diameter of 3.5 mm (for a 0.5 mm pixel size). If larger structuring elements are used, the subsequently used mass filter size is changed (as discussed below). At the same time irregular densities are rounded by this process.

This morphological operation is different from the conventional operation in the sense that a threshold E is used to control how much structure is eroded. If the difference, i.e. the gray level value of a pixel in the image prior to the morphological operation, I(x,y), minus the gray level value after the morphological operation, P(x,y), is larger than the threshold E (step 316), then the gray level value of the pixel is replaced by the output of the morphological operation (step 317). Examples of E can range from 0–10 in terms of gray levels. When dilation is performed, if the gray level after dilation exceeds the original gray level of the pixel, the original gray level value is used for the pixel. This is repeated for all pixels.

Referring to FIG. 1A, the morphological step is performed at different image resolutions. For example, resolution 1 (step 104) can use an image having a 0.5 mm pixel size (resolution 1), with the image being 512×512 pixels. The process is repeated in parallel for images having 1 mm, 1.5 mm, 2.5 mm, etc. pixel size with a corresponding decrease in image size as the pixel size increase (for 1.0 mm pixel size, the image is 256×256, etc.).

The process can also be conducted serially with a change in the resolution for each iteration. A second embodiment of the method according to the invention is shown in FIG. 1B. After steps 100–103, the morphological operation is performed at a beginning resolution (step 104), followed by mass filtering (step 107) and template matching (step 110). The image resolution is changed in step 116 and the results of the matching are stored in step 117. It then determined whether the maximum resolution has been exceeded (step 118). If no, the process is repeated at the new resolution. If yes, feature extraction, integration and classification (steps 113–115) are performed the same as in FIG. 1A.

FIG. 1C shows a third embodiment of the invention. The method shown in FIG. 1C differs from the method shown in FIG. 1B in that a thresholding operation 119 is performed using the output of the mass filtering step. The mass filtered image identifies areas suspected of containing a lesion that can be further processed by gray-level thresholding. After thresholding the image with the remaining suspected lesions is input to step 113 for feature analysis, followed by steps 114 and 115, as in the method of FIG. 1B.

FIG. 4 is a diagram illustrating the circular kernel used in the mass filter. For detection of circumscribed densities a mass filter with a circular base is used (this mass filter is a modified IRIS filter; for a description of the IRIS filter see Kobatake et al., CAR 1993: pp 624–629). The kernel is ring-shaped (pixels 402) around a center pixel 400. Note in this kernel that the center pixel locations 401 are absent since they would not contribute useful values to the overall filter value (as described below). A ring-shaped filter rather than just a solid circular filter is thus used.

The mass filter value is based on the local gradient (in the embodiment a 7×7 kernel is used) in x- (Dx) and y- (Dy) directions. Differences from the description of the IRIS filter in Kobatake et al. include use of a ring-shaped filter, second derivative instead of the gradient, and edge orientation bins. Gradient values smaller than a gradient threshold (e.g., 10) are not used in the calculation of the filter value.

Figure 5:
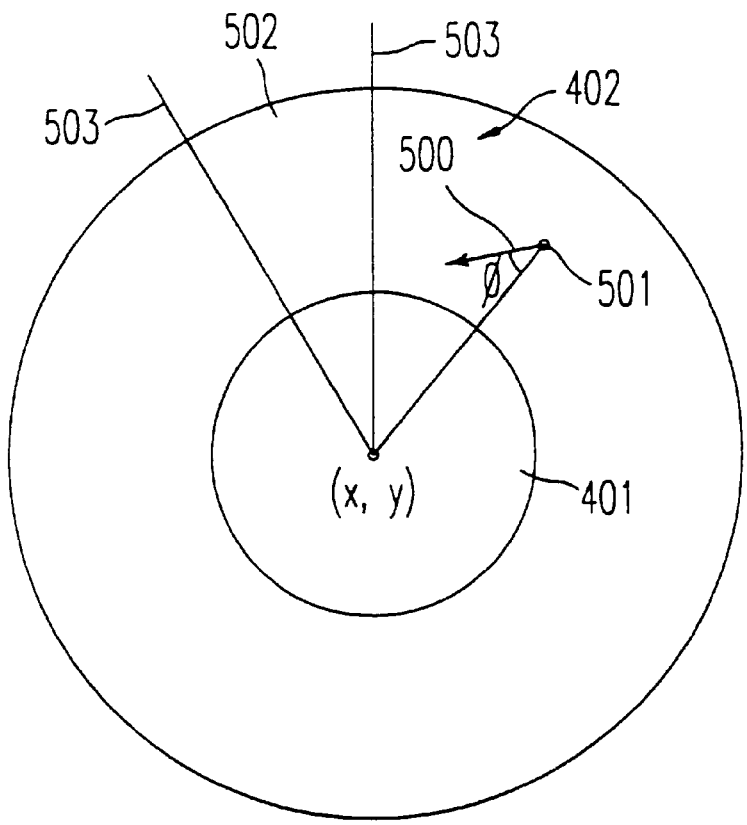
FIG. 5 is a diagram illustrating a gradient vector in the modified mass filtering.

The edge orientation at a specific image point is equivalent to the gradient vector and the edge strength is calculated as the second derivative in edge orientation. FIG. 5 shows a gradient 500 at point 501. This assures that regions with a constant gradual slope do not contribute to the mass filter value. The gradient is oriented at an angle $\phi$ relative to a radial line from point 501 to point (x,y). The filter value is calculated separately for a specific number of edge orientation bins, such as 16 ($B_1$, $B_2$ ... $B_{16}$). Orientation bins are radial sectors of the circular area. For example, each of 16 bins would cover an angle of $\pi/8$. A bin 502, shown for a sector of $\pi/8$, is made of the pixels 402 between lines 503.

The calculation for a given pixel location (x,y) is given for the calculation of each orientation bin by:

$$f(B_i) = (1/N) \Sigma_{P \ in \ K}[MAX(0, \cos \phi)*\text{Edge Strength (at P)}]$$

where:

$f(B_i)$ filter value for edge orientation bin

K filter kernel

P neighbor point in K

N number of points in K $\phi$ angle between gradient vector and connection line center point/neighbor point Edge strength is obtained from the second derivative of P calculated in edge orientation. The final filter value is calculated as sum of the individual orientation bins, where a specified number of bins j, for example 4, with the highest values are ignored. That is:

$$\text{filter value at pixel } l(x,y) = \Sigma_{i-j} f(B_i)$$

for $B_i$ not equal to the j highest bins. This prevents an influence of straight edges (e.g. the pectoralis muscle border) on the filter value, since all points along this edge are within the same orientation bin without changing the filter value for ideal circular lesions.

Usually the filter value is highest in the center of a lesion. The highest filter values are found for round or slightly oval shaped lesions. The neighborhood used in calculation of the filter value is empirically determined to be around 10 pixels (outer radius); this could be increased to improve the detection of oval shaped masses. In addition, a gradient threshold can be employed so that pixels in the neighborhood that have a gradient smaller than the threshold (e.g., 10) do not contribute to the calculation of the filter value.

The image outputted by the mass filter is then subjected to template matching. Local maxima of the filter value define potential center points of mass lesions, which are used in steps 111–113, the matching of a deformable template on to the lesion border. The edges of the suspect lesion can be obtained from the derivative or second derivative of the image output from the mass filtering. The deformable shape template is defined using Fourier descriptors. An initial shape is selected and the Fourier descriptors are varied to dynamically fit the shape of the lesion. Fourier descriptors are described in, for example Arbter et al., Application of Affine-invariant Fourier Descriptors to Recognition of 3-D Objects, IEEE Trans. Pattern Analysis Machine Intelligence 12:640–647 (1990); Kuhl et al., Elliptic Fourier Features of a Closed Contour, Computer Graphics Image Processing 18:236–258 (1982); Wallace et al., An Efficient Three-dimensional Aircraft Recognition Algorithm Using Normalized Fourier Descriptors, ibid., 13:99–126 (1980); Granlund, Fourier Preprocessing for Hand Print Character Recognition, IEEE Trans. Computers 21:195–201 (1972); Zahn et al., Fourier Descriptors for Plane Closed Curves. ibid., 21:269–281 (1972); Crimmins, A Complete Set of Fourier Descriptors for Two-dimensional Shape, IEEE Trans. Sys. Man Cybernetics 12:848–855 (1982); Persoon et al., Shape Discrimination Using Fourier Descriptors, ibid., 7:170–179 (1977); and Richard et al., Identification of Three-dimensional Objects Using Fourier Descriptors of the Boundary Curve, ibid., 4:371–378 (1974).

In the template matching step the object contour is generated as an inverse Fourier transform of a limited number of complex Fourier terms. The following relationship exists between a closed planar curve g(l) and Fourier descriptors $c_k$: g(l) planar curve and Fourier descriptors:

$$c_k = |c_k|e^{j\Phi_k} = (1/L)\int_0^L g(l)e^{-j\pi k l/L}dl$$

where:

g(l) is a planar curve with a runlength l; the real of part of g=x coordinate, the imaginary part of g=y coordinate $c_k$ Fourier descriptors with $-N/2 \leq k \leq N/2$, $N \to \infty$ By variation of the terms −2, −1, 0, 1, and 2 arbitrary elliptical or kidney shape contours can be generated. The terms −2 to 2 were selected since the lesions are of simple shape. However, one can modify the terms using a priori knowledge of the lesions to be detected. The term 0 defines the position and the terms −1 and 1 define size and orientation of the main ellipse.

In the mass detection the following fourier descriptors are used:

$c_k=0$ for $k \leq \leq -2$ or $k>2$ $c_{-1}=sp_1 e^{j\alpha}$ $c_0=x+jy$ $c_1=se^{j\alpha}$ $c_2=sp_2 e^{j(\alpha+\pi)}$ x x center position y y center position s size α orientation (angle between main ellipse and x-axis)

$p_1$: variable parameter to describe the short/long axis ratio of the main ellipse with $0 \leq p_1 \leq 0.5$ (long axis: $s+sp_1$, short axis: $s-sp_1$, for $P_1=0$, the Fourier descriptors define a circle as a special case of an ellipse)

Figure 6:
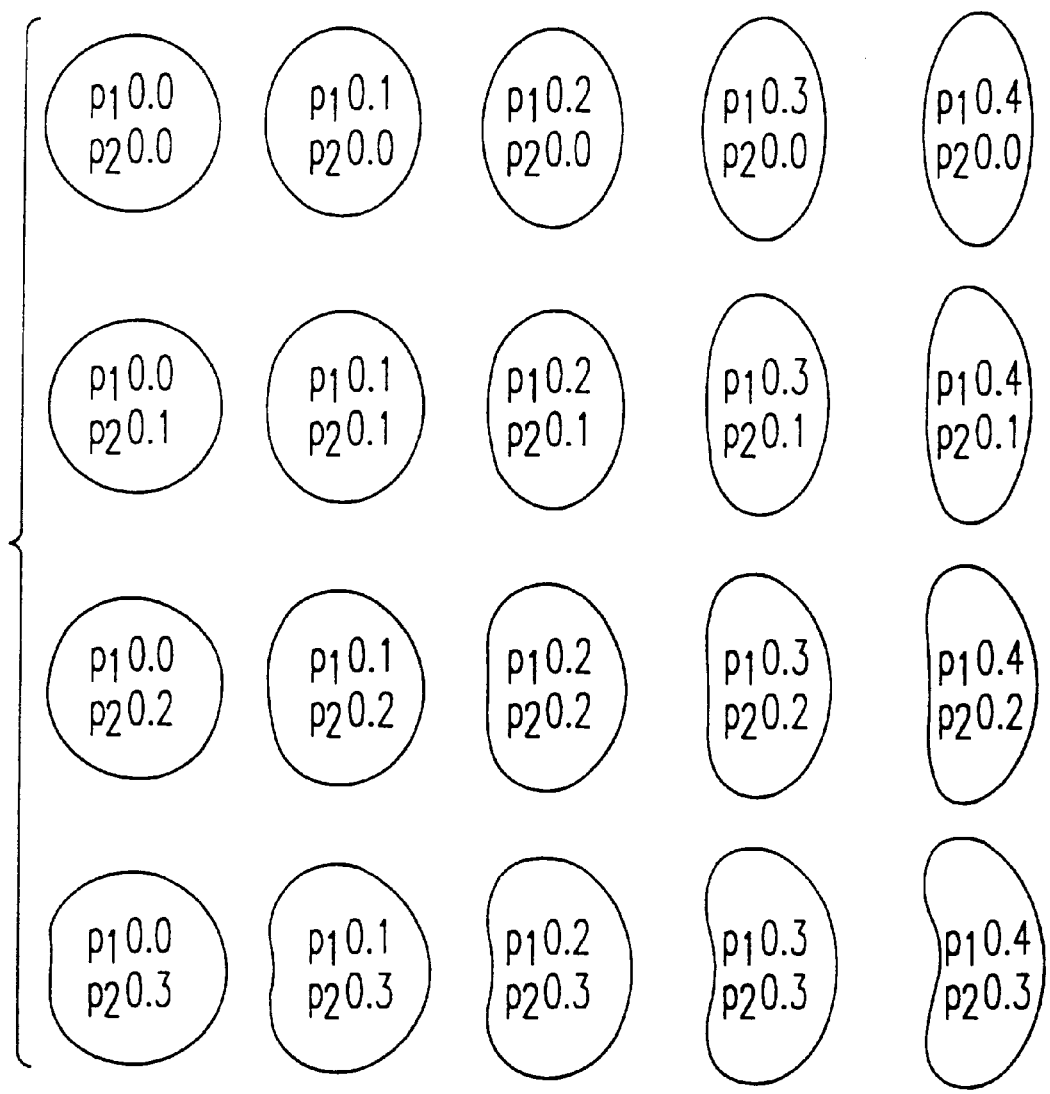
FIG. 6 is a diagram illustrating examples of the deformable templates corresponding to the possible shapes assigned to localized densities from the Fourier descriptors analysis.

$p_2$ variable parameter to describe the degree of asymmetry (kidney shape) with $0 \leq p_2 \leq 0.3$ FIG. 6 is a diagram illustrating examples of the deformable templates corresponding to the possible shapes assigned to localized densities from the Fourier descriptors analysis discussed above, with the $p_1$ and $p_2$ values indicated for each shape. Note that the center position and the angle (orientation) and the size of each can be varied. FIG. 6 is an example of possible shapes, and the invention is not limited to these particular shapes or this number of shapes.

The lesion contour is generated by variation of the Fourier terms within a certain range with minimization of a cost function using lesion contrast, edge strength and deviation from the ideal circular shape. This process is performed on the output from the mass filter. Simulated annealing is used for minimization.

Simulated annealing is a technique for optimization, which involves a description of possible system configurations, a generator of random changes in the configuration (i.e., the "options"), a function for minimization and a control parameter (temperature) that controls the increments of the random changes. It is described in, for example, *Numerical Recipes* by Press, et al., Cambridge Press (1988).

The configuration in the embodiment is the "correct" Fourier descriptor of an extracted contour. This configuration could be obtained as an entire curve or in radial segments of the curve using different Fourier descriptors for each segment. Once "fit", the inverse of the Fourier descriptors is performed yielding the contour. With the radial segments, only a limited number of points are generated in the inverse transformation. The changes in the configuration (i.e., the contour shape, that is the Fourier descriptor coefficients $c_k$) are changed by changes in the center location, the size of the "lesion", the orientation (α), the long/short axis ratio (indicating the degree of being oval) and the degree of asymmetry. The method limits the changes to these in the Fourier descriptors. Examples of the range of variation for each parameter include increments in center position by one pixel, a size range of 5 to 80 pixels in diameter with an increment of 2 pixels, and a range in a from −360° to 360°. The function to be minimized includes a center cost index of 20 (in each direction), a size cost index of 10 and an angle cost index of 10. The starting temperature was set at 30. Upon minimizing the cost function, the difference between the "lesion" center and the "fit" center, the difference between the size of the "lesion" and the size of the "fit", the Euclidean difference between x-y position of the lesion contour and the x-y position of the fit contour, etc. are minimized. The temperature is modified (cooled) as the iterations increase so that after a specified number of iterations a downward step in the temperature is taken.

In the template matching the following can be varied: the shape in terms of Fourier descriptors, the penalty factor for deviations from the mean, the center, the angle and the size. The penalty factor is a measure based on standard deviation, i.e. a limit on the amount of deformation during the template matching.

An example of the parameter file used in the deformable template matching is shown below:

a shape file giving which part of the curve is used start temperature for the simulated annealing number of iterations increments such as for incrementing the center position, the size, the angle during the simulated annealing number of points generated in the inverse transformation. Note that after the matching is successful, the final coefficients of the Fourier descriptors are used to return to the x,y domain. Thus, discontinuous margin pixels along a "mass" will be connected. The output of the template matching is contour or a partial contour of the suspect lesion.

Sixteen edge maps can be used in the shape matching. Edge maps are obtained from the second derivative, as described above. Edge maps are used since sometimes there is only one good edge in the suspected lesion. The lesion contour is generated by variation of the Fourier terms within a certain range with minimization of a cost function using lesion contrast, edge strength and deviation from the ideal circular shape. Simulated annealing is used for minimization. In the matching one can have varied the following: the shape in terms of Fourier descriptors, the penalty factor deviations from the mean, the center, the angle and the size.

For further characterization a rectangular ROI containing the suspected lesion identified in the open, mass filtering and template matching operations is extracted from the original peripheral density enhanced image. Feature extraction and analysis is performed on the suspected lesion. Feature extraction and is described in application Ser. No. 08/158, 389 to Giger et al., the disclosure of which is herein incorporated by reference.

Figure 7:
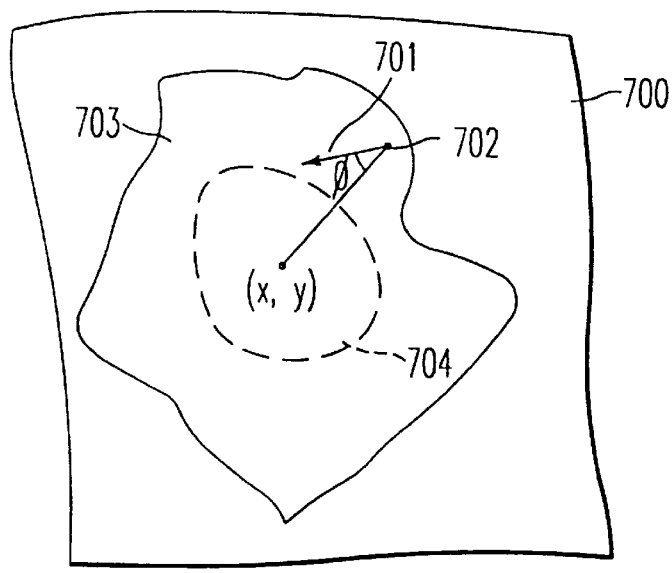
FIG. 7 is a diagram of calculating a gradient in a region of interest.
Figure 8:
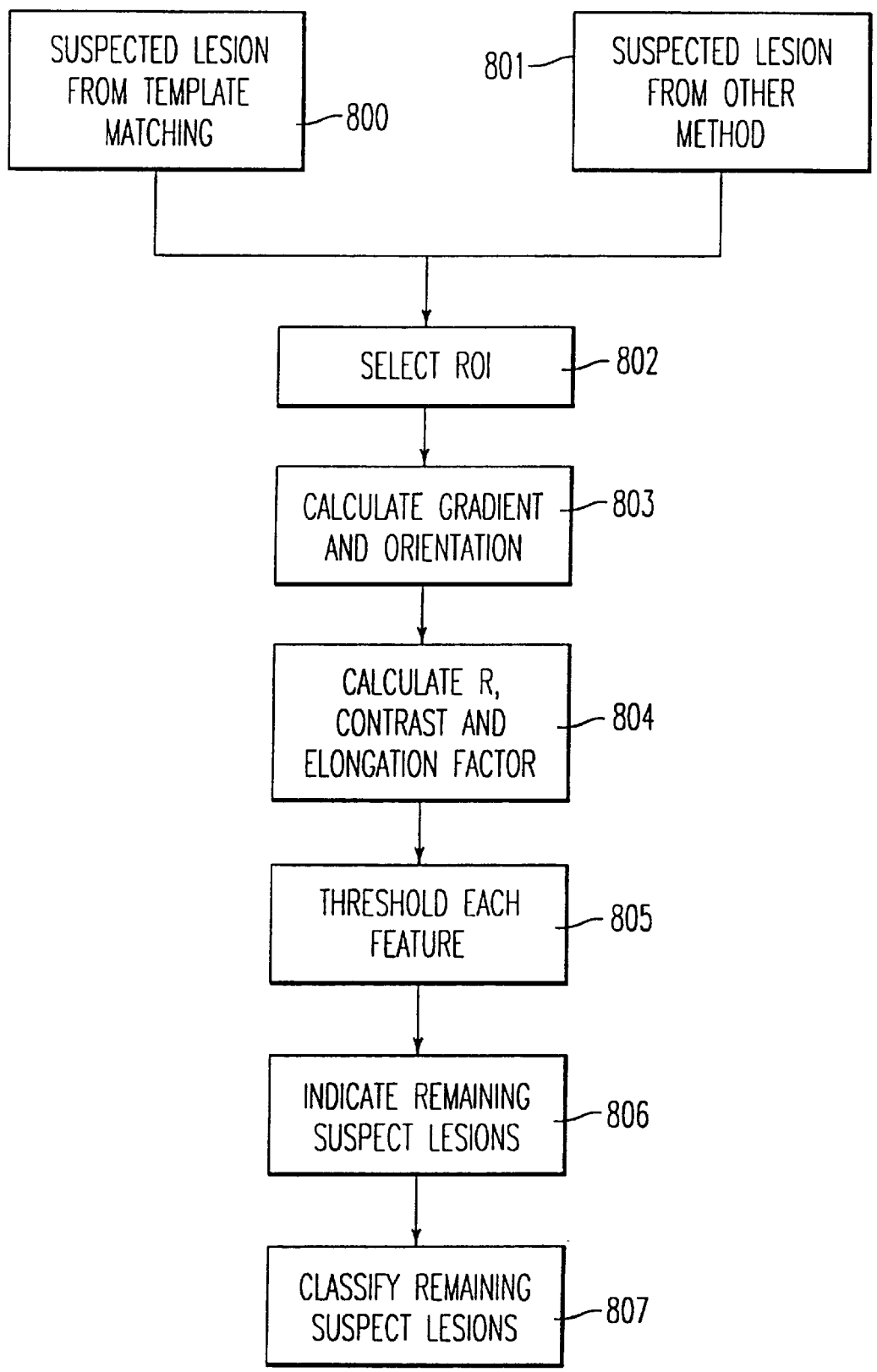
FIG. 8 is a schematic diagram illustrating the analysis of a suspected lesion.

This is shown in more detail in FIG. 8. The suspected lesion from the template matching is obtained (step 800). Note that a suspected lesion from another method, by a computer or manually by an observer, can also be used as input (step 801). A region of interest (ROI) containing the suspected lesion is selected (automatically or manually) in step 802. The gradient and orientation of the ROI is calculated in step 803, followed by a calculation of the gradient index R, contrast and elongation factor in step 804. This is shown in more detail in FIG. 7, where in an ROI 700 a gradient 701 is calculated at a point 702 in a suspected lesion 703 having a center point (x,y). The pixels in the area enclosed by dashed line 704 are those pixels that do not contribute much to the gradient index (the gray value varies more towards the edge of the suspected lesion), and may be excluded.

The radial gradient index R, defined as follows:

$$R = \frac{\sum_{P \in L} \cos\phi \sqrt{D_x^2 + D_y^2}}{\sum_{P \in L} \sqrt{D_x^2 + D_y^2}}$$

where:

R radial gradient index $-1 \leq R \leq 1$

P image point (x,y) center of suspected lesion from template matching

L detected lesion excluding the center part $D_x$ gradient in x-direction $D_y$ gradient in y-direction $\phi$ angle between gradient vector and connection line center (x,y) to P The radial gradient index is a measure of circularity and density characteristics of the lesion. The radial gradient index approaches 1 for ideal circular lesions. This radial gradient index can be viewed as the average gradient in the radial direction normalized by the average gradient. The suspected lesion size is given by the difference between the gray level at the center to that at the margin of the suspected lesion.

To limit the number of false positives, thresholding is performed in step 805. For example, lesions with a diameter less than some preset value (e.g. <4 mm), a contrast less than some preset value (e.g. <0.1 optical density) or a radial gradient less that a preset value (e.g., 0.5) are eliminated.

The features after thresholding are indicated in step 806 and can be merged using, for example, rule-based methods or an artificial neural network trained to detect and classify lesions (step 807) to eliminate further more false positives or to distinguish between malignant and benign lesions. Malignant and benign lesions will possess different R values if the maglinant lesion is highly spiculated.

The open, mass filtering and template matching are performed repeatedly with different resolutions. In each resolution step a specific lesion size is detected. FIG. 9A is a table illustrating the relationship between pixel size of the image and the lesion size being detected. The number and size of resolutions chosen depends upon the type of lesions to be detected and the amount of processing time available for detection.

Figure 10:
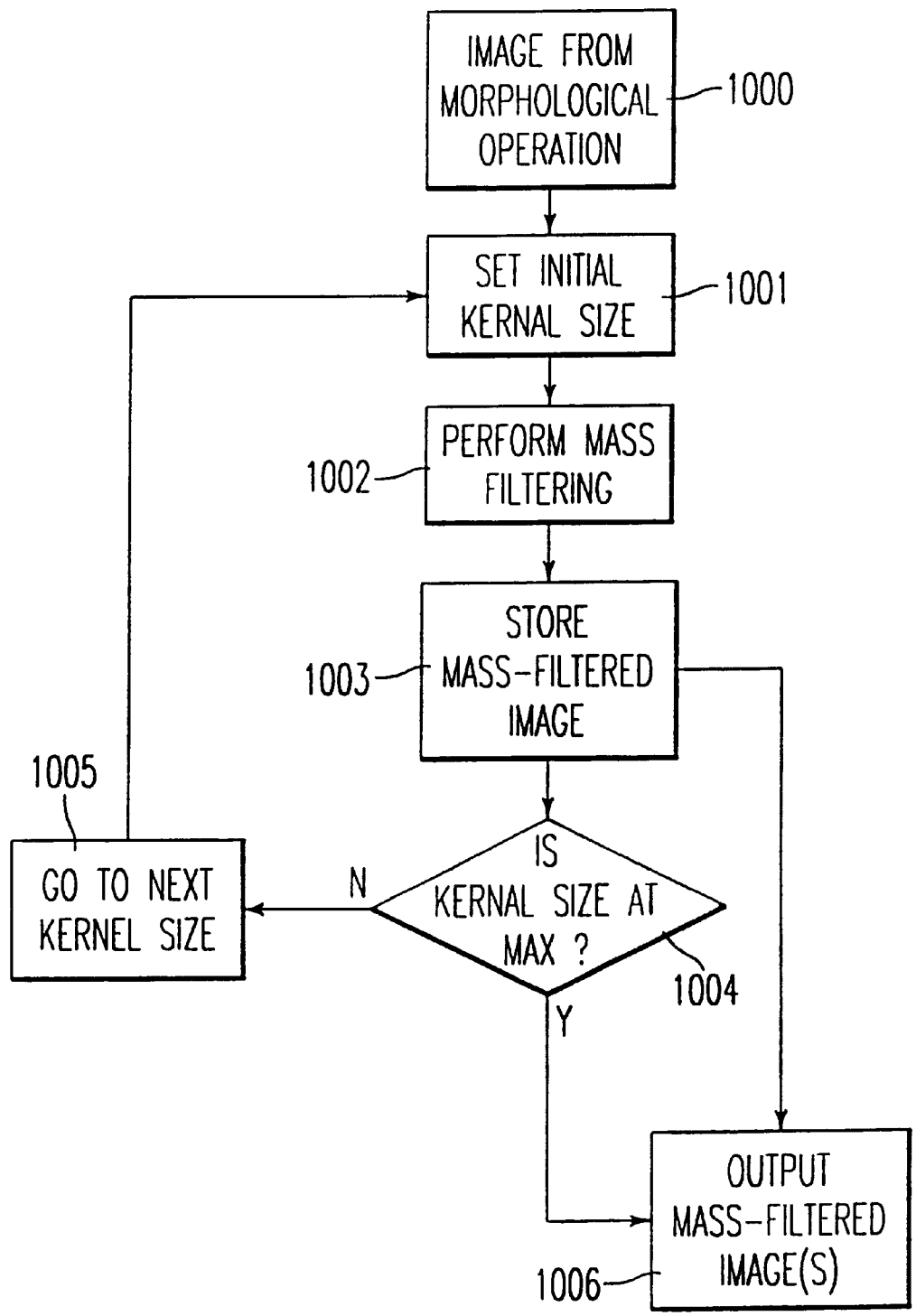
FIG. 10 is a schematic diagram of the changing of the kernel size in mass filtering.

The kernel size in the mass filtering can also be varied. FIG. 9B is a table showing the relationship between kernel size and the size of the lesion being detected. In the embodiments described above, a single mass filter can be chosen for the different resolutions of the open filter. In a modification of theses embodiments, the kernel size in the mass filtering can be varied, for example as shown in FIG. 9B. The modified mass filtering step is shown in FIG. 10. The image resolution is kept constant while the kernel size is varied, the kernel size is kept constant while the image resolution is varied, or both can be varied.

In step 1000, the image from the morphological operation is obtained. The initial kernel size is set (step 1001) and the mass filtering is performed at the initial kernel size (step 1002). The image after mass filtering is stored (step 1003). Next, it is checked whether the maximum kernel size has been reached in step 1004. If no, then a new kernel size is selected (step 1005) and the mass filtering is performed again. After the last kernel size is used, the images are output (step 1006).

After features analysis has been performed, in step 116 of FIG. 1A the different detected lesions from all of the outputs obtained from different resolution images, different size kernels, or both, are integrated. Locations indicating the same lesion may show up in more than one image.

Figure 11:
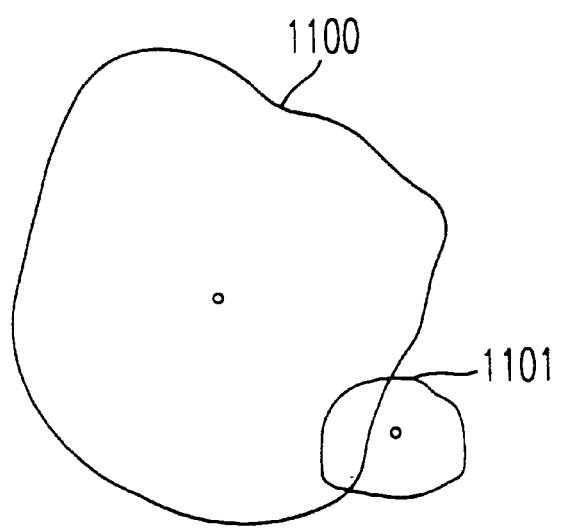
FIG. 11 is a diagram of two detected lesions.

If two lesions overlap, the lesion with the smaller radial gradient index is eliminated. The amount of acceptable overlap can be varied by specifying the percent of overlap allowed. In the embodiment, 30% was chosen, but other values can be used. Referring to FIG. 11, two lesions 1100 and 1101 are shown. The smaller lesion, having the larger gradient index is kept.

FIGS. 12A–12F illustrate example of (12A) an original mammogram, (12B) after border segmentation, (12C) after the modified open operation, (12D) after the mass filtering, (12E) after template matching and (12F) after feature extraction in which the suspect lesions are prioritized by number (with one being the most suspicious). In this case lesion 1 was an intramammary lymph node with a radial gradient index of 0.92, lesion 2 was a 10 mm invasive ductal cancer (R=0.90), lesion 3 was a 7 mm invasive ductal cancer (R=0.85), and lesions 4 through 7 were false positive with R ranging from 0.78 to 0.52.

Figure 12A:
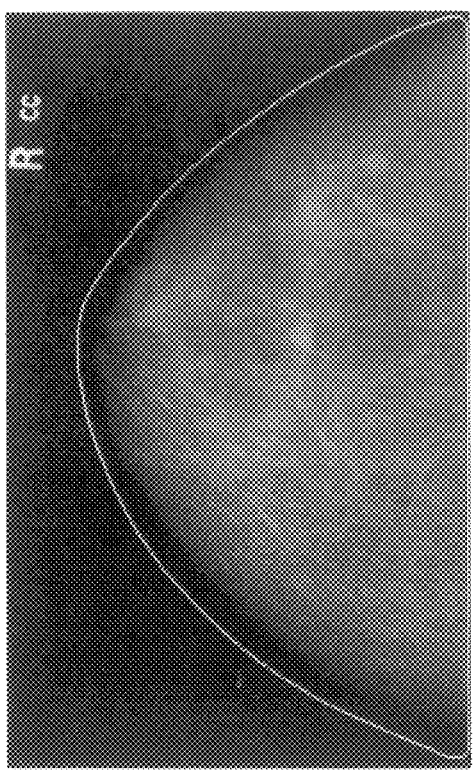
FIGS. 12A–12F illustrate examples of (12A) an original mammogram, (12B) after border segmentation, (12C) after the modified open operation, (12D) after the modified mass filter, (12E) after template matching and (12F) after feature extraction.
Figure 12B:
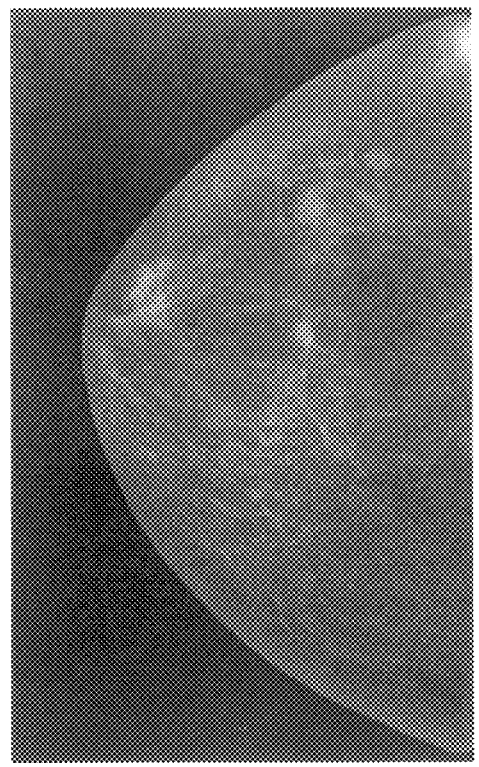
Figure 12C:
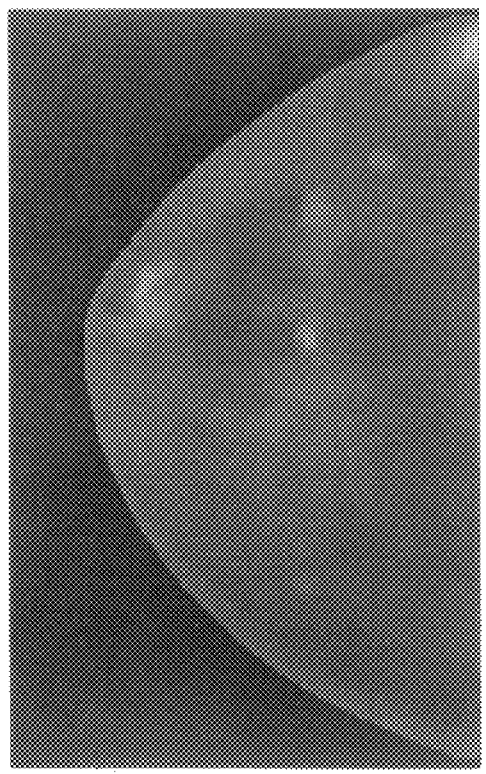
Figure 12D:
Figure 12E:
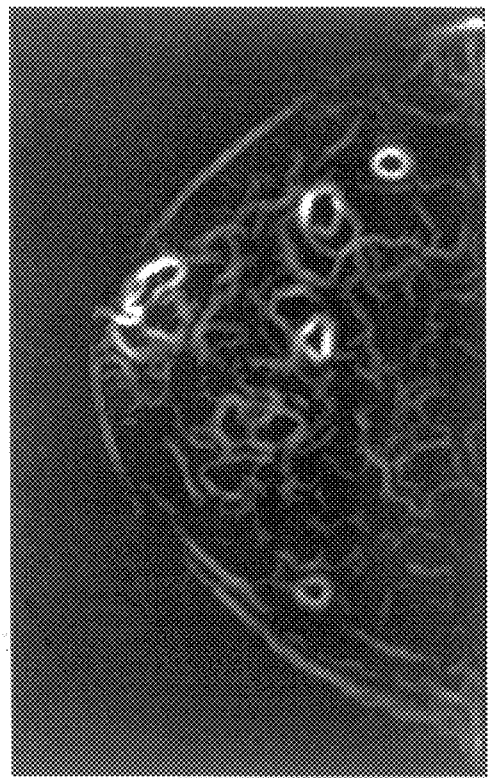
Figure 12F:
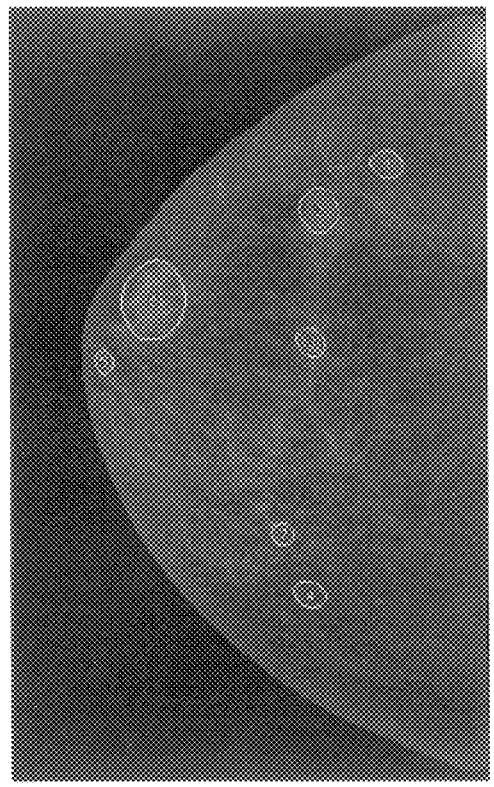

In FIG. 12D the suspected lesions are evidently highlighted, allowing their extraction through thresholding as described above. FIG. 12E contains many contrast features not evident from a visual inspection of FIG. 12D. The template matching is sensitive to subtle variations in the mass-filtered image.

Figure 13A:
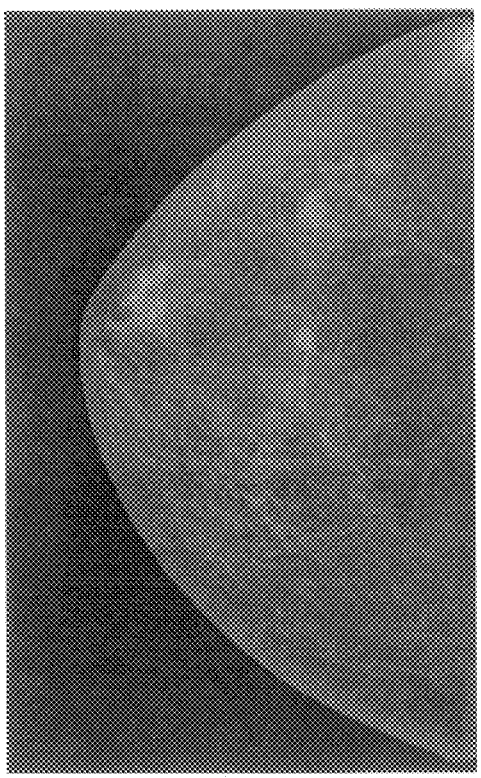
FIGS. 13A–13F illustrate examples of (13A) a mammogram, after peripheral enhancement, (13B) after morphological filtering, (13C) a image of the difference of the images of FIGS. 13A and 13B, and (13D–13F) after morphological filtering with pixel sizes of 1, 2 and 4 mm.
Figure 13B:
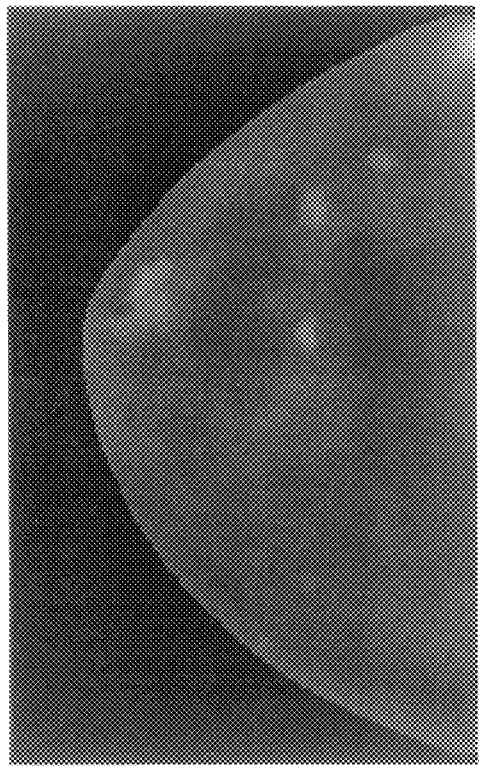
Figure 13C:
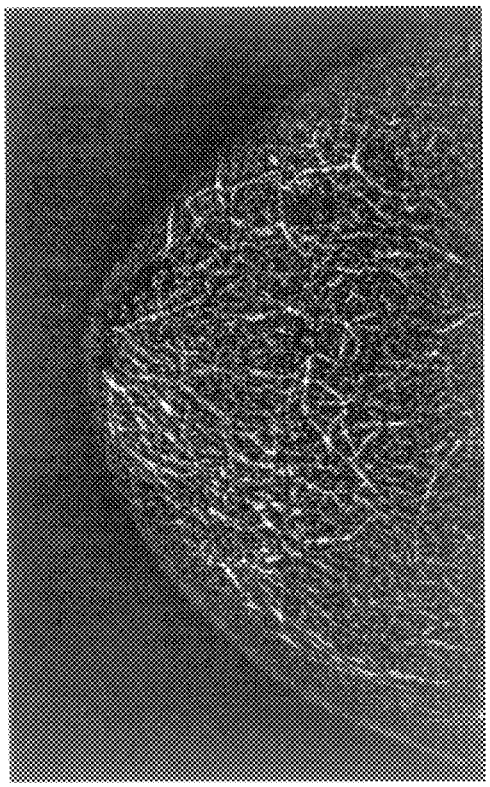
Figure 13D:
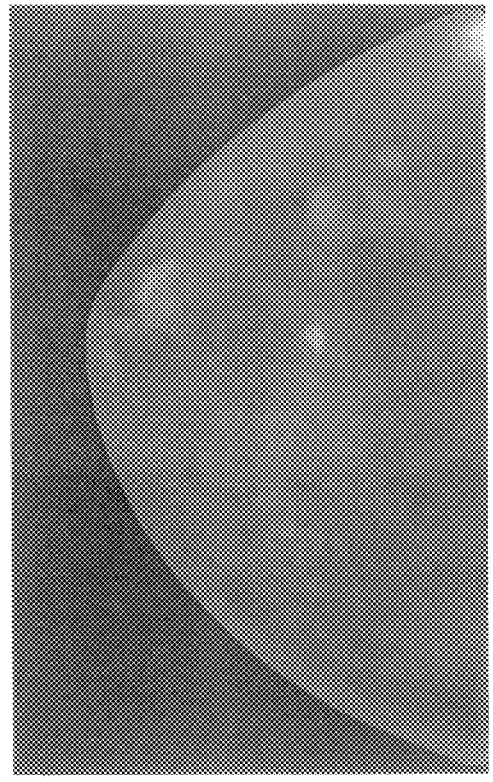
Figure 13E:
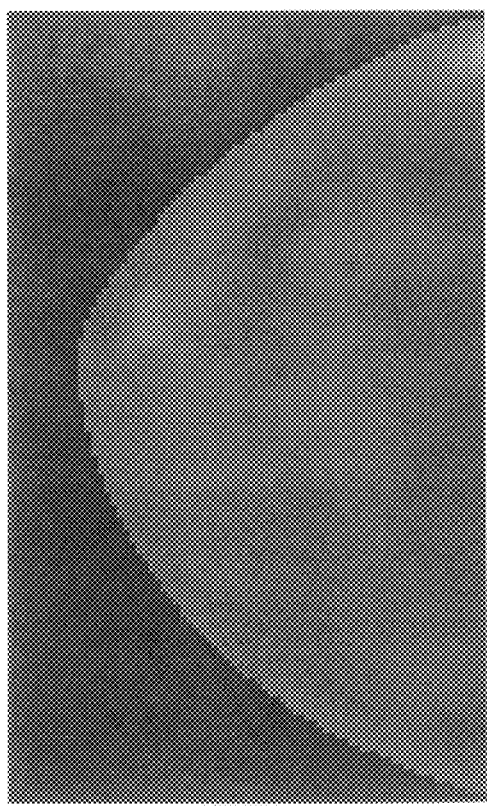
Figure 13F:
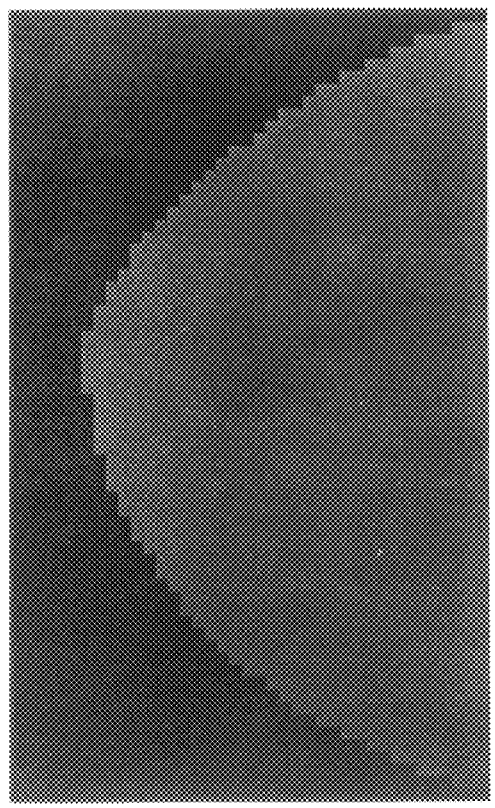

FIGS. 13A–13F show examples of a mammogram (13A) after peripheral enhancement and (13B) after morphological filter with a pixel size of 0.5 mm. FIG. 13C shows the difference image of FIG. 13A minus FIG. 13B, illustrating the small detail, non-lesion like structures that are eliminated by the morphological operation. The effect of morphological operations with different pixel sizes is shown in FIGS. 13D–13F for pixel sizes of 1.0 mm, 2.0 mm and 4.0 mm, respectively.

Figure 14A:
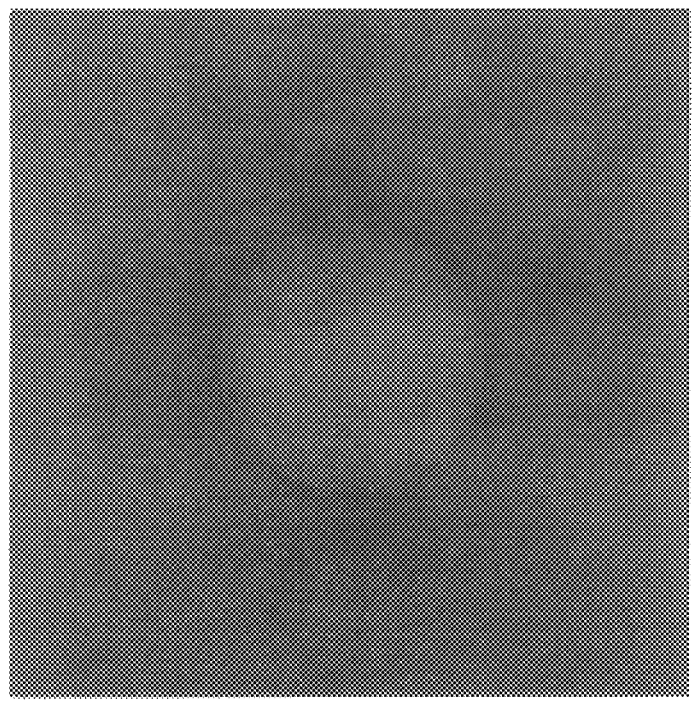
FIGS. 14A–14C illustrate (14A) an artificial lesion, (14B) its detection results, and (14C) the edge maps used in the detection.
Figure 14B:
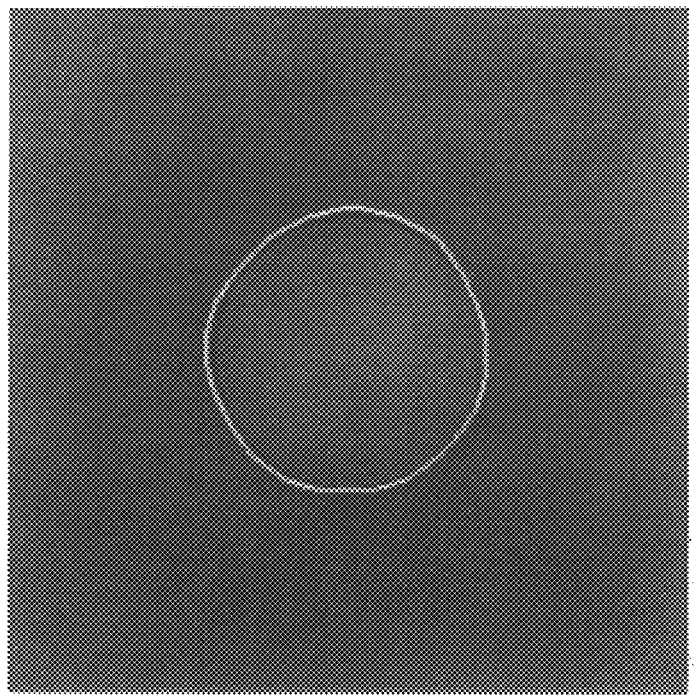
Figure 14C:
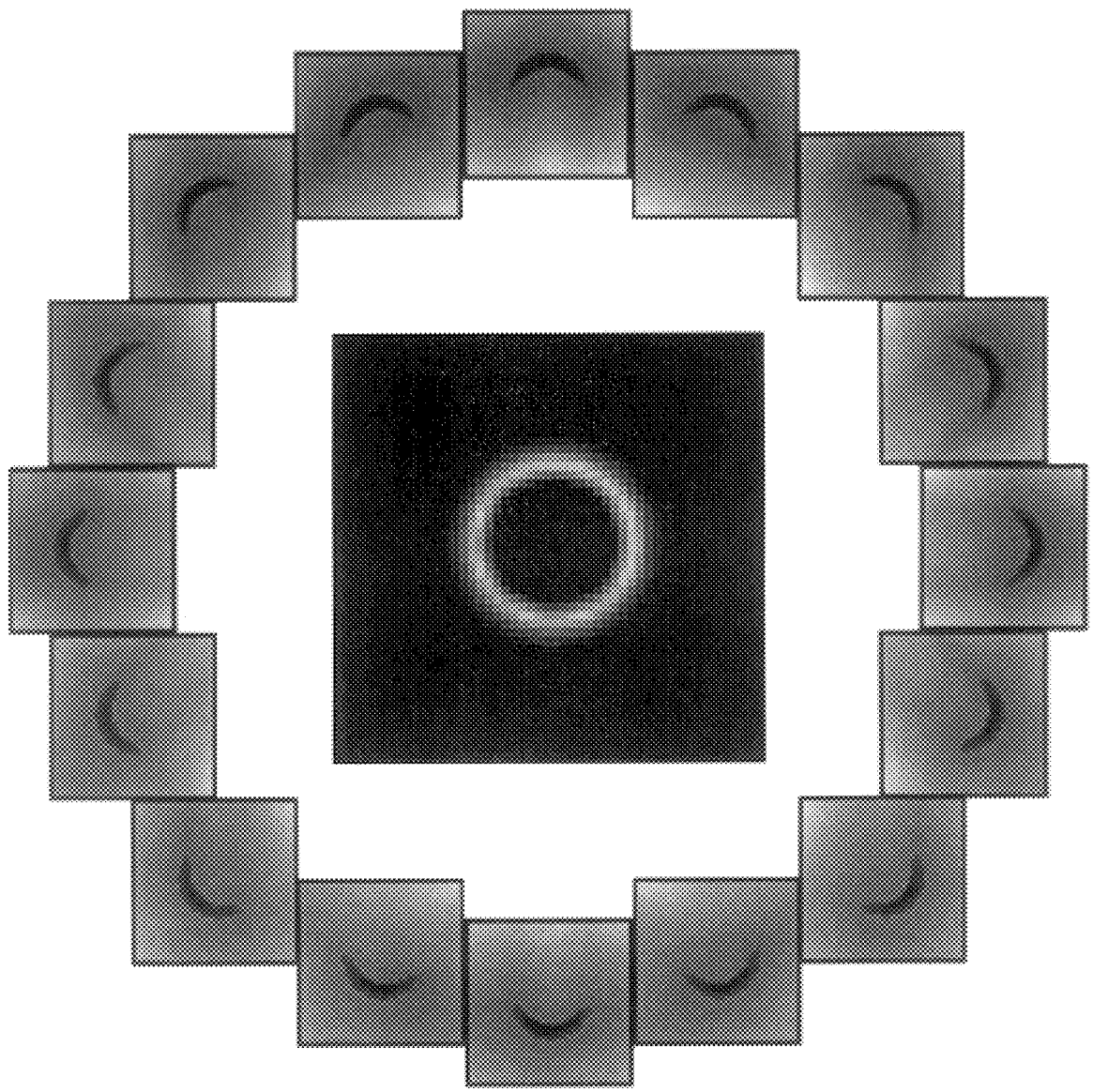

FIGS. 14A–14C illustrates (14A) an artificial ideal spherical lesion and (14B) its detection results. FIG. 14C shows the 16 directional edge maps used in the method. The 16 edge maps correspond to 16 equal radial sectors making up the circular lesion. Other numbers of edge maps can be chosen.

Figure 15A:
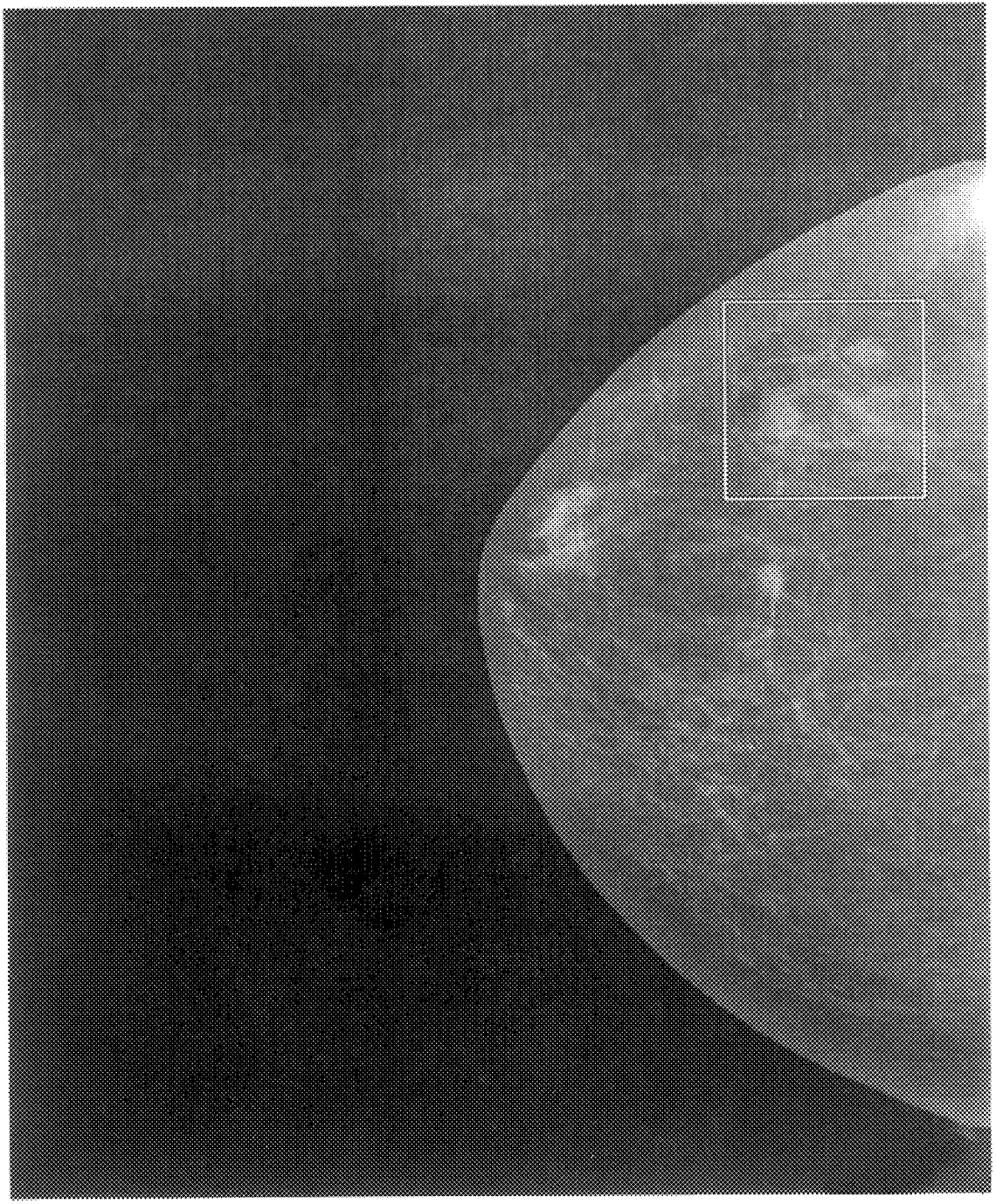
FIG. 15A shows the location of a region of interest (ROI) used for feature analysis.
Figure 15B:
FIGS. 15B–15D show enlargement of the ROI of FIG. 15A, a truth margin, and detection results, respectively.
Figure 15C:
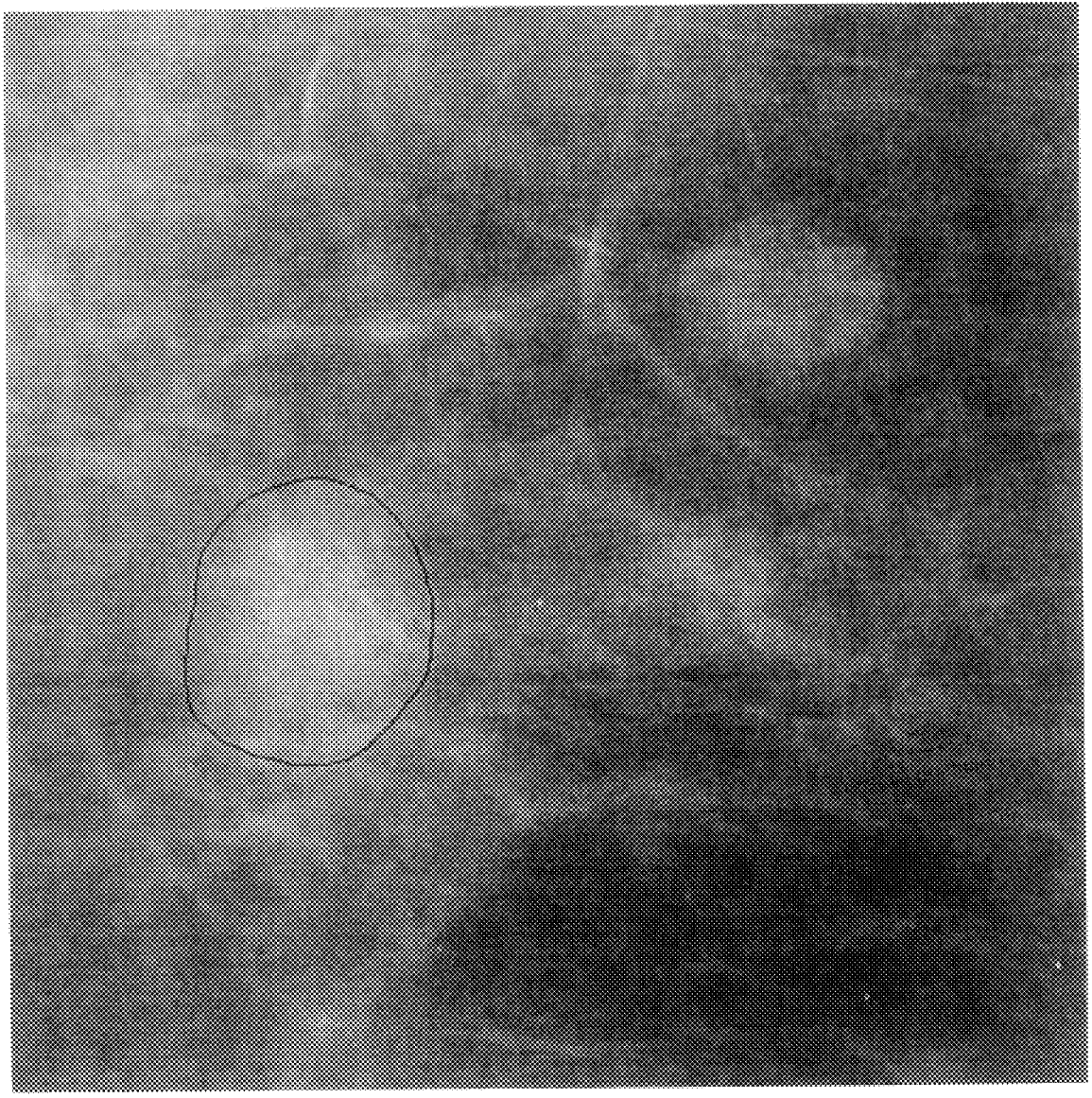
Figure 15D:
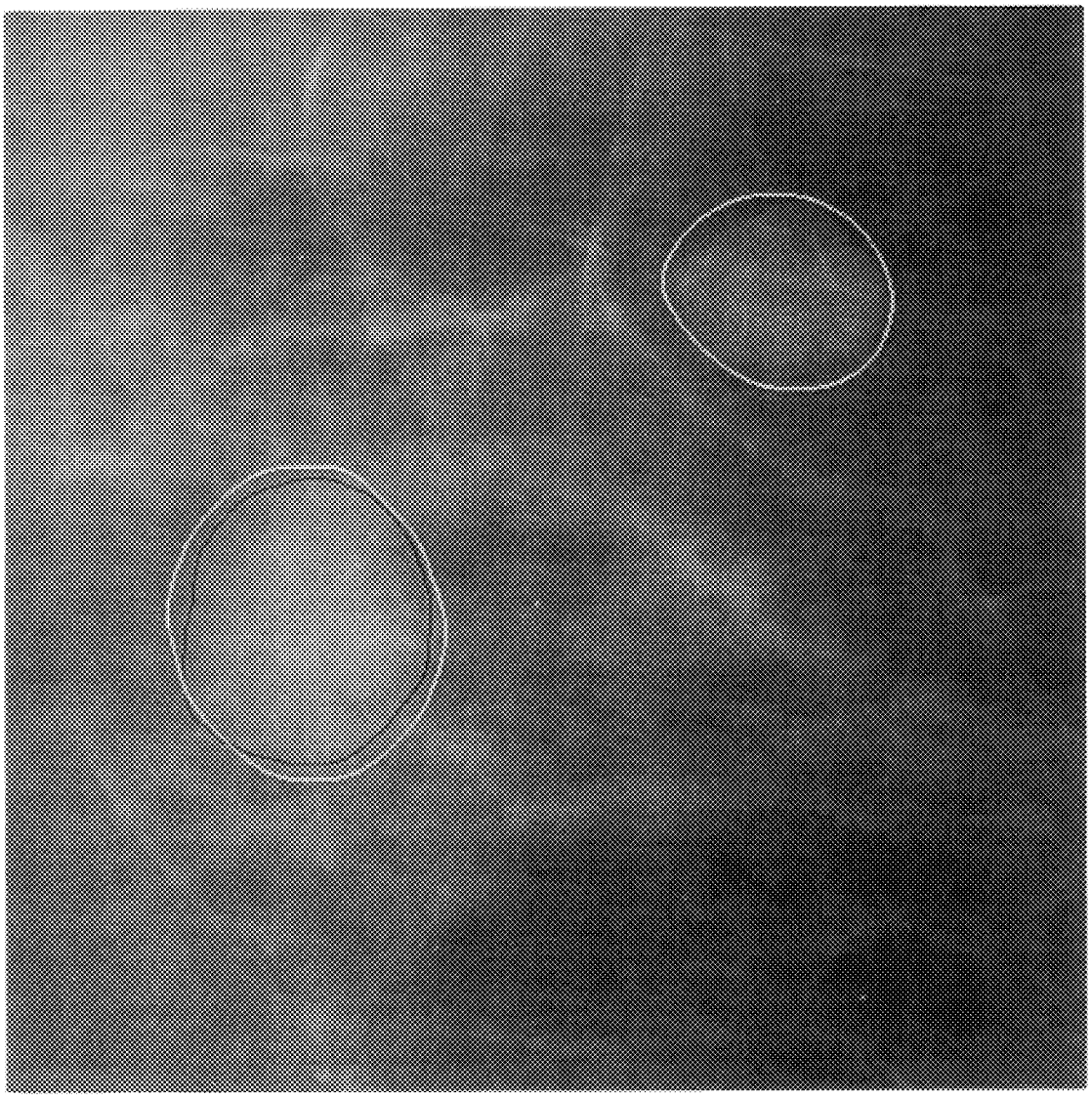

FIG. 15A shows the location of the ROI used for feature analysis within the original mammogram after peripheral enhancement. FIGS. 15B–15D show enlargements of the ROI, the truth margin as marked by a radiologists and the detection result for lesions 1 and 2 from FIG. 12F, respectively.

Figure 16:
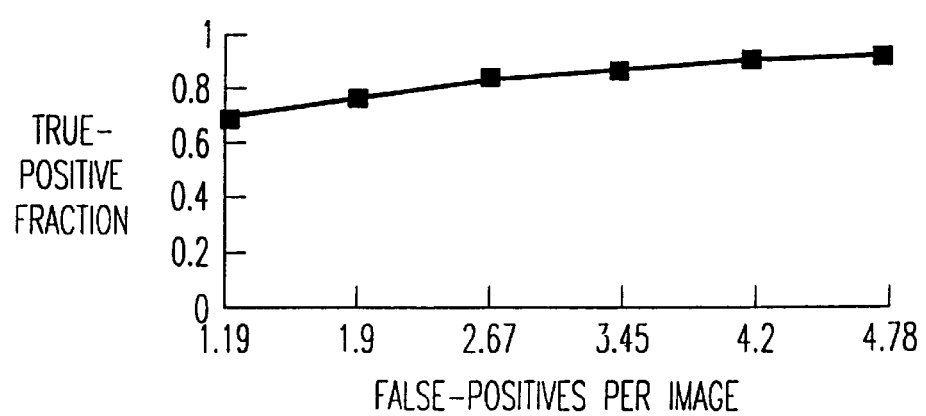
FIG. 16 is a graph illustrating the performance of the method in the detection of malignant lesions in a screening mammographic database.

FIG. 16 is a graph illustrating the performance of the method in the detection of malignant lesions in a screening mammographic database in terms of FROC (free response operating characteristic) curve. For this performance evaluation, 45 invasive cancers less than 10 mm in size were used.

Figure 17:
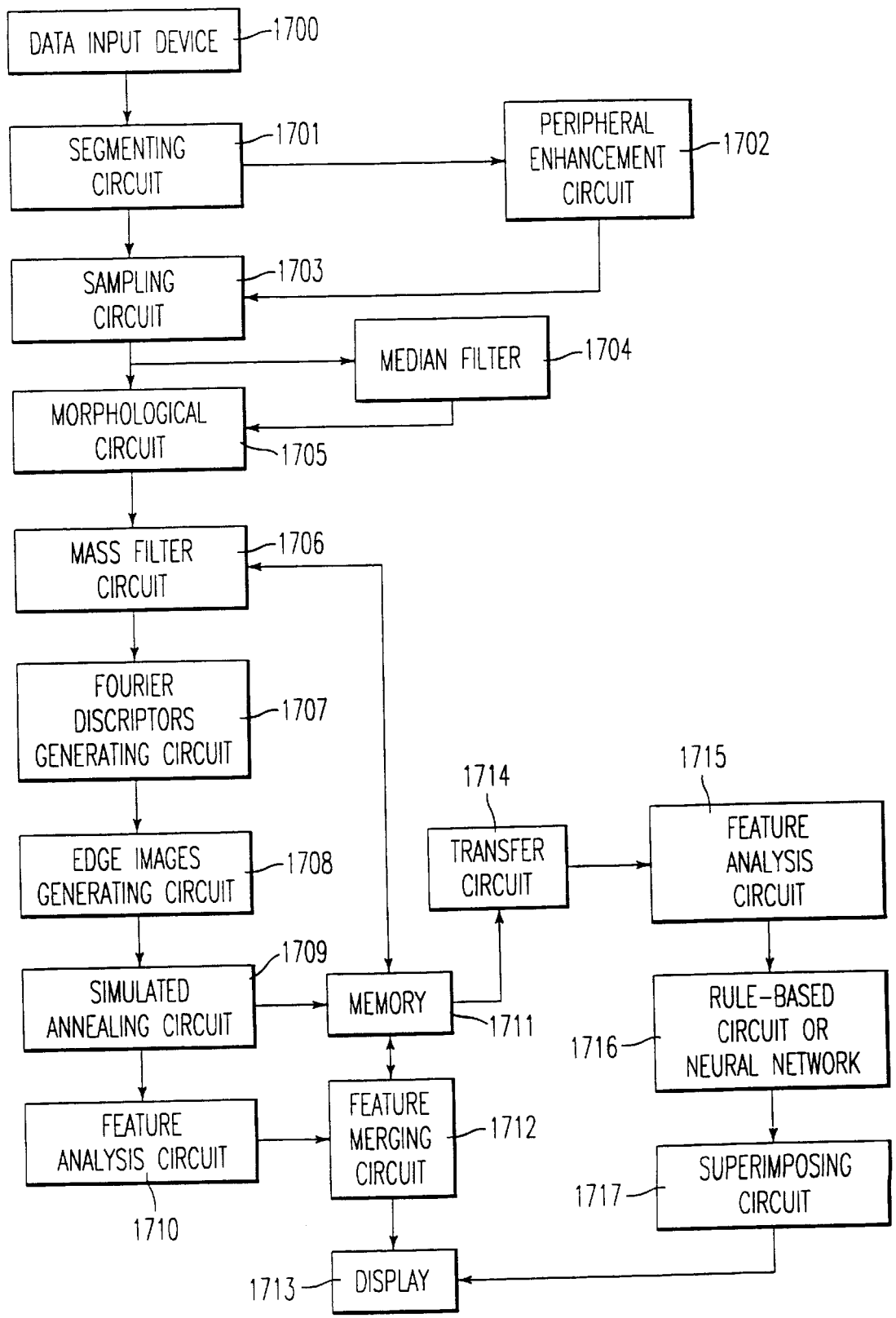
FIG. 17 is a schematic block diagram illustrating a system for implementing the automated method for the detection of lesions in medical images.

FIG. 17 is a schematic block diagram illustrating a system for implementing the automated method for the detection of lesions in medical images. The system of FIG. 17 operates and carries out functions as described above. A data input device 1700, such as a x-ray mammography device with a laser scanner and digitizer, produces a digitized mammogram. The digitized mammogram is segmented by segmenting circuit 1701 and then input to a peripheral enhancement circuit 1702 or sampling circuit 1703. Either the digitized mammogram or the peripherally enhanced is sampled by the sampling circuit 1703 (to select a pixel size) and then optionally processed by a modified median filter 1704. Either the output of the sampling circuit 1703 or the filter 1704 is input to and processed by morphological circuit 1705. The output of circuit 1705 is fed to mass filter circuit 1706 for mass filtering. Next, the mass-filtered image is fed to a Fourier descriptors generating circuit 1707, edge images generating circuit 1708 and simulated annealing circuit 1709 for template matching. The image(s) are then fed to a feature analysis circuit 1710 for feature extraction and analysis. Memory 1711 is available to store images. The features are merged for classification and integration in feature merging circuit 1712, and can be displayed on display 1713, such as a video display terminal.

The images can also be transferred from memory 1711 via transfer circuit 1714 to a feature analysis circuit 1715 to perform feature extraction and analysis. The features are fed to a rule-based circuit or neural network 1716 to perform detection and classification of lesions. Superimposing circuit 1717 allows the detected lesions to be displayed on the images.

The elements of the system of FIG. 17 can be carried out in software or in hardware, such as a programmed microcomputer. The neural network can also be carried out in software or as a semiconductor layout.

Obviously, numerous modifications and variations of the present invention are possible in light of the above technique. It is therefore to be understood that within the scope of the appended claims, the invention may be practiced otherwise than as specifically described herein. Although the current application is focussed on the detection and classification of mass lesions in mammograms, the concept can be expanded to the detection and classification of abnormalities in other organs in the human body, such as the lungs and the liver.

What is claimed as new and desired to be secured by Letters Patent of the United States is:

1. A method for the automated detection of a mass lesion in mammographic images, comprising:
   generating a mammogram;
   segmenting said mammogram to produce a segmented mammogram;
   performing a modified morphological operation on said segmented mammogram; and
   detecting whether said lesion is present in said mammogram;
   wherein said modified morphological operation comprises:
      determining a first gray-level value of a pixel in said segmented mammogram using morphological processing;
      determining a difference between a second gray level value of said pixel before performing said morphological operation and said first value; and
      substituting said first value for said second value in said segmented mammogram if said difference is greater than a threshold value.

2. A method as recited in claim 1, comprising performing said modified morphological operation using a plurality of filter sizes.

3. A method as recited in claim 1, wherein segmenting said mammogram comprises segmenting a breast border from said mammogram.

4. A method as recited in claim 1, wherein segmenting said mammogram comprises:
   performing noise analysis on said mammogram;
   applying a gray value range operator;
   performing global gray-level histogram analysis to provide a thresholded image;
   region growing using said thresholded image;
   performing a morphological erosion operation; and
   determining a distance map.

5. A method as recited in claim 1, comprising:
   peripherally enhancing said segmented image to produce an enhanced image; and
   performing said modified morphological operation using said enhanced image.

6. A method as recited in claim 5, wherein said peripherally enhancing said segmented image comprises:
   determining average gray-level values of pixels as a function of distance from a border of a breast in said mammogram;
   fitting an enhancement curve to said gray-level values;
   reversing a fit of said enhancement curve to obtain a second enhancement curve; and
   adding said second enhancement curve to a curve of said average gray-level values as a function of distance.

7. A method as recited in claim 1, comprising:
   processing said segmented image to produce a processed image; and
   performing said modified morphological operation using said processed image.

8. A method as recited in claim 7, wherein processing said segmented image comprises:
   obtaining a gray-level value in said segmented image at a first pixel;
   determining a local gray-level minimum in said segmented image in a neighborhood of pixels disposed around said first pixel;
   substituting said local gray-level minimum for said gray-level value of said first pixel when a first difference between said minimum and said gray-level value is greater than a first gray-level threshold value; and repeating said obtaining, determining and substituting steps for selected pixels of said segmented image to obtain a processed image.

9. A method as recited in claim 8, comprising:

determining whether a pixel in said processed image is a seed pixel; and performing said modified morphological operation using said seed pixel.

10. A method as recited in claim 9, wherein determining whether said pixel is said seed pixel comprises:

determining a local gray-level maximum of said neighborhood;

a first step of determining whether a first difference between said gray-level value and said local gray level minimum is less than a second difference between said local gray-level maximum and said gray-level value; and a second step determining whether said pixel is within a predetermined distance of a pixel having said local minimum gray-level value.

11. A method as recited in claim 9, comprising:

performing said modified morphological operation at a selected seed pixel in said segmented image;

determining whether a second difference of a first gray-level value of said selected seed pixel before performing said modified morphological operation and a second gray-level value of said selected seed pixel after performing said morphological operation is less than a second gray-level threshold value;

replacing said first gray-level value with said second gray-level value when said second difference is greater than said second gray-level threshold value.

12. A method as recited in claim 1, wherein said detecting step comprises:

extracting features using a result of said morphological operation, said mass filtering and said template matching;

integrating said features; and classifying said features.

13. A method as recited in claim 1, comprising:

performing mass filtering after performing said modified morphological operation to produce a filtered image performing template matching using said filtered image;

performing thresholding using said filtered image; and detecting said lesions using said template matching and said thresholding.

14. A method as recited in claim 1, comprising:

performing mass filtering; and performing template matching.

15. A method as recited in claim 14, comprising:

performing said modified morphological operation, said mass filtering and said template matching serially at a plurality of morphological resolutions;

wherein said modified morphological operations performed at said plurality of resolutions are conducted in parallel.

16. A method as recited in claim 14, comprising:

performing said modified morphological operation, said mass filtering and said template matching serially at a plurality of morphological resolutions;

wherein said modified morphological operations performed at said plurality of resolutions are conducted iteratively.

17. A method as recited in claim 16, further comprising thresholding a mass filtered image obtained from said mass filtering.

18. A method as recited in claim 14, further comprising:

thresholding a mass filtered image obtained from said mass filtering to obtained a threshold image;

using said threshold image in detecting said lesions.

19. A method as recited in claim 18, wherein:

said detecting step comprises performing feature extraction; and said threshold image is used in said feature extraction.

20. A method as recited in claim 14, wherein performing said mass filtering comprises:

using a ring-shaped kernel; and determining a filter value based upon a second derivative of edge orientation.

21. A method as recited in claim 14, wherein said template matching comprises:

determining a deformable shape template; and fitting said shape template to a shape of a suspected lesion.

22. A method as recited in claim 21, comprising:

determining said deformable shape template using Fourier descriptors; and varying said descriptors to dynamically fit said shape template to said shape of said suspected lesion.

23. A method as recited in claim 21, comprising:

determining said shape template as an inverse Fourier transform having a plurality of Fourier terms;

varying said Fourier terms to fit said shape template to said shape of said suspected lesion; and outputting a contour of said suspected lesion.

24. A method as recited in claim 23, wherein varying said Fourier terms comprises minimizing a cost function using simulated annealing.

25. A method as recited in claim 23, comprising:

varying a center location, a size, an orientation, a ratio of a long axis to a short axis, and a degree of asymmetry of said inverse Fourier transform.

26. A method as recited in claim 21, comprising:

determining a center of a suspected lesion as a maximum mass filter value;

determining edges of said suspected lesion as one of a derivative and a second derivative of said image after mass-filtering; and fitting said template using said center and said edges.

27. A method as recited in claim 14, wherein performing said mass filtering comprises:

selecting an initial kernel size of a mass filter;

performing mass filtering using said initial kernel size to produce a mass-filtered image;

varying said kernel size up to a maximum kernel size; and performing mass filtering at each kernel size and producing corresponding mass-filter images.

28. A method as recited in claim 27, comprising:

performing said template matching on each of said mass-filter images;

detecting suspected lesions in said mass-filtered images; and integrating said suspected lesions.

29. A method as recited in claim 28, wherein integrating said suspected images comprises:

determining whether suspected lesions in said mass-filtered images spatially overlap; and eliminating selected ones of overlapping suspected lesions.

30. A method as recited in claim 29, comprising:

determining a radial index for each of said overlapping suspected lesions; and eliminating one of said overlapping suspected lesions having a smaller radial index.

31. A method as recited in claim 1, comprising:

selecting a region of interest containing said lesion; and performing feature extraction using said region of interest.

32. A method as recited in claim 31, comprising:

selecting said region of interest containing a lesion identified using template matching.

33. A method as recited in claim 31, wherein performing feature extraction comprises:

determining a gradient of said region of interest;

determining an orientation of said region of interest;

determining a gradient index of said region of interest;

determining a contrast of said region of interest; and determining an elongation factor of said region of interest.

34. A method as recited in claim 33, comprising:

thresholding at least one of said gradient, orientation, gradient index, contrast and elongation factor.

35. A method as recited in claim 34, comprising:

determining a final filter value as a sum of said filter values.

36. A method as recited in claim 35, comprising:

determining said final filter value using a plurality of said orientation bins excluding a predetermined number of said orientation bins having highest values.

37. A method for the automated detection of mass lesions in mammographic images, comprising:

generating a mammogram;

segmenting said mammogram to produce a segmented mammogram;

performing a morphological operation on said segmented mammogram;

performing mass filtering; and detecting whether a lesion is present in said image;

wherein performing said mass filtering comprises:

determining a filter value for a plurality of edge orientation bins; and wherein determining said filter value comprises:

calculating said filter value using:

$$f(B_i) = (1/N)\Sigma_{P \text{ in } K}\{\text{MAX}(0, \cos\phi)*\text{EDGE STRENGTH (at P)}\}$$

where:

$f(B_i)$ is said filter value at an orientation bin;

K is a filter kernel;

P is a neighbor point in K;

N is a number of points in K; and $\Phi$ is an angle between a gradient vector and a connection line between said neighbor point and a center point.

38. A system for detecting lesions in a medical image, comprising:

a data input device;

a segmenting circuit connected to said input device;

a modified morphological circuit connected to receive an output of said segmenting circuit; and a lesion detecting circuit operably connected to the modified morphological circuits;

wherein said modified morphological circuit comprises:

a gray level value determining circuit adapted to determine a first gray-level value of a pixel in said segmented mammogram using morphological processing;

a difference circuit adapted to obtain a difference between a second gray level value of said pixel before performing said morphological operation and said first value; and a pixel substitution circuit adapted to substitute said first value for said second value in said segmented mammogram if said difference is greater than a gray-level threshold value.

39. A system as recited in claim 38, comprising:

a peripheral enhancement circuit connected to said segmenting circuit;

wherein said morphological circuit is further connected to receive an output of said peripheral enhancement circuit.

40. A system as recited in claim 39, comprising:

a sampling circuit connected to said segmenting, peripheral enhancement and morphological circuits;

wherein said sampling circuit is connected to receive said outputs of said segmenting and peripheral enhancement circuits; and said morphological circuit is connected to receive an output of said sampling circuit.

41. A system as recited in claim 38, wherein said morphological circuit comprises:

means for performing a modified morphological operation using a plurality of filter sizes.

42. A system as recited in claim 38, wherein said morphological circuit comprises:

means for determining whether a pixel in said medical image is a seed pixel; and means for performing a modified morphological operation using said seed pixel.

43. A system as recited in claim 38, wherein:

said gray level value determining circuit comprises means for obtaining a gray-level value in said medical image at a first pixel;

said difference circuit comprises means for determining a local gray-level minimum in said segmented image in a neighborhood of pixels disposed around said first pixel; and said pixel substitution circuit comprises means for substituting said local gray-level minimum for said gray-level value of said first pixel when a difference between said minimum and said gray-level value is greater than said gray-level threshold value.

44. A system as recited in claim 43, comprising:

means for determining a local gray-level maximum of said neighborhood of pixels;

first means for determining whether a first difference between said gray-level value and said local gray level minimum is less than a second difference between said local gray-level maximum and said gray-level value; and second means for determining whether said pixel is within a predetermined distance of a pixel having said local minimum gray-level value.

45. A system as recited in claim 38, comprising:

a mass filter circuit connected to said modified morphological circuit;

a template matching circuit connected to said mass filter circuit; and a feature analysis circuit connected to said template matching circuit;

wherein said lesion detecting circuit is connected to the feature analysis circuit.

46. A system as recited in claim 45, wherein said template matching circuit comprises:

a Fourier descriptor generating circuit;

an edge generating circuit connected to said Fourier descriptor generating circuit; and a simulated annealing circuit connected to said edge generating circuit.

47. A system as recited in claim 45, wherein said mass filter circuit comprises:

means for determining a filter value for a plurality of edge orientation bins; and means for determining a final filter value as a sum of said filter values.

48. A system as recited in claim 45, wherein said template matching circuit comprises:

means for determining a deformable shape template; and means for fitting said shape template to a shape of a suspected lesion.

49. A system as recited in claim 48, wherein said template matching circuit further comprises:

means for determining said deformable shape template using Fourier descriptors; and means for varying said descriptors to dynamically fit said shape template to said shape of said suspected lesion.

50. A system as recited in claim 48, wherein said template matching circuit further comprises:

means for determining said shape template as an inverse Fourier transform having a plurality of Fourier terms;

means for varying said Fourier terms to fit said shape template to fit said shape template to said shape of said suspected lesion; and means for outputting a contour of said suspected lesion.

51. A system as recited in claim 50, wherein said template matching circuit further comprises:

means for varying a center location, a size, an orientation, a ratio of a long axis to a short axis, and a degree of asymmetry of said inverse Fourier transform.

52. A system as recited in claim 45, wherein said template matching circuit further comprises:

means for determining a center of a suspected lesion as a maximum mass filter value;

means for determining edges of said suspected lesion; and means for fitting said template using said center and said edges.

53. A system as recited in claim 45, wherein said feature extraction circuit comprises:

means for determining a gradient of said region of interest;

means for determining an orientation of said region of interest;

means for determining a gradient index of said region of interest;

means for determining a contrast of said region of interest; and means for determining an elongation factor of said region of interest.

54. A system as recited in claim 45, wherein said feature extraction circuit further comprises a thresholding circuit.

55. A system as recited in claim 45, wherein said mass filter circuit comprises:

means for selecting an initial kernel size of a mass filter;

means for performing mass filtering using said initial kernel size to produce a mass-filtered image;

means for varying said kernel size up to a maximum kernel size; and means for performing mass filtering at each kernel size and producing corresponding mass-filter images.

* * * * *